(12) United States Patent
Lin et al.

(10) Patent No.: US 11,238,311 B2
(45) Date of Patent: Feb. 1, 2022

(54) METHOD FOR IMAGE CLASSIFICATION, COMPUTER DEVICE, AND STORAGE MEDIUM

(71) Applicant: SHENZHEN UNIVERSITY, Guangdong (CN)

(72) Inventors: Di Lin, Guangdong (CN); Hui Huang, Guangdong (CN)

(73) Assignee: Shenzhen University, Guangdong (CN)

(*) Notice: Subject to any disclaimer, the term of this patent is extended or adjusted under 35 U.S.C. 154(b) by 0 days.

(21) Appl. No.: 16/606,166

(22) PCT Filed: Jun. 8, 2018

(86) PCT No.: PCT/CN2018/090370
§ 371 (c)(1),
(2) Date: Oct. 17, 2019

(87) PCT Pub. No.: WO2019/218410
PCT Pub. Date: Nov. 21, 2019

(65) Prior Publication Data
US 2021/0365732 A1    Nov. 25, 2021

(30) Foreign Application Priority Data

May 15, 2018 (CN) .......................... 201810462613.5

(51) Int. Cl.
*G06N 3/04* (2006.01)
*G06K 9/62* (2006.01)
*G06K 9/32* (2006.01)
*G06N 3/08* (2006.01)
*G06K 9/34* (2006.01)

(52) U.S. Cl.
CPC ............. *G06K 9/6257* (2013.01); *G06K 9/32* (2013.01); *G06K 9/342* (2013.01); *G06K 9/628* (2013.01);

(Continued)

(58) Field of Classification Search
CPC ............ G06K 9/32; G06K 9/342; G06N 3/04; G06N 3/08
See application file for complete search history.

(56) References Cited

U.S. PATENT DOCUMENTS 8,165,354 B1    4/2012  Zhao
2017/0364536 A1    12/2017  Di et al.

FOREIGN PATENT DOCUMENTS

CN    103218827 A    7/2013
CN    106529565 A    3/2017
(Continued)

OTHER PUBLICATIONS

Lin, et al., "Deep LAC: Deep Localization, Alignment and Classification for Fine-grained recognition", 2015 IEEE Conference on Computer Vision and Pattern Recognition (CYPR) dated Dec. 15, 2015 (10 pages).

(Continued)

*Primary Examiner* — Sam Bhattacharya
(74) *Attorney, Agent, or Firm* — Brandon V. Zuniga; James R. Gourley; Carstens & Cahoon, LLP

(57) ABSTRACT

A method for image classification includes acquiring a to-be-classified image and inputting the to-be-classified image to a trained image classification model, the trained image classification model includes a localization segmentation sub-network, an alignment sub-network, and a classification sub-network, the alignment sub-network is formulized as a valve linkage function, the image classification model is obtained, and in a forward-propagation phase, an output of the valve linkage function is an aligned image; in a backward-propagation phase, the output of the valve linkage function is a function; subjecting the to-be-classified image through the localization segmentation sub-network for locating and segmenting a target object of the to-be-classified image to obtain a segmented image; subjecting the (Continued)

segmented image through the alignment sub-network, the alignment sub-network aligning the target object to obtain an aligned image; and subjecting the aligned image through the classification sub-network for fine-grain classification to obtain a class corresponding to the to-be-classified image.

20 Claims, 15 Drawing Sheets

(52) U.S. Cl.
CPC ......... *G06K 9/6215* (2013.01); *G06K 9/6218* (2013.01); *G06N 3/04* (2013.01); *G06N 3/08* (2013.01)

(56) References Cited

FOREIGN PATENT DOCUMENTS

| | | | |
|---|---|---|---|
| CN | 106530305 | A | 3/2017 |
| CN | 107016409 | A | 8/2017 |
| CN | 107592839 | A | 1/2018 |
| CN | 107622272 | A | 1/2018 |
| CN | 108009518 | A | 5/2018 |

OTHER PUBLICATIONS

International Search Report for Application No. PCT/CN2018/090370 dated Jan. 31, 2019 (2 pages).
Office Action for Chinese Application No. 20181042613.5 dated Jul. 27, 2021 (7 pages).

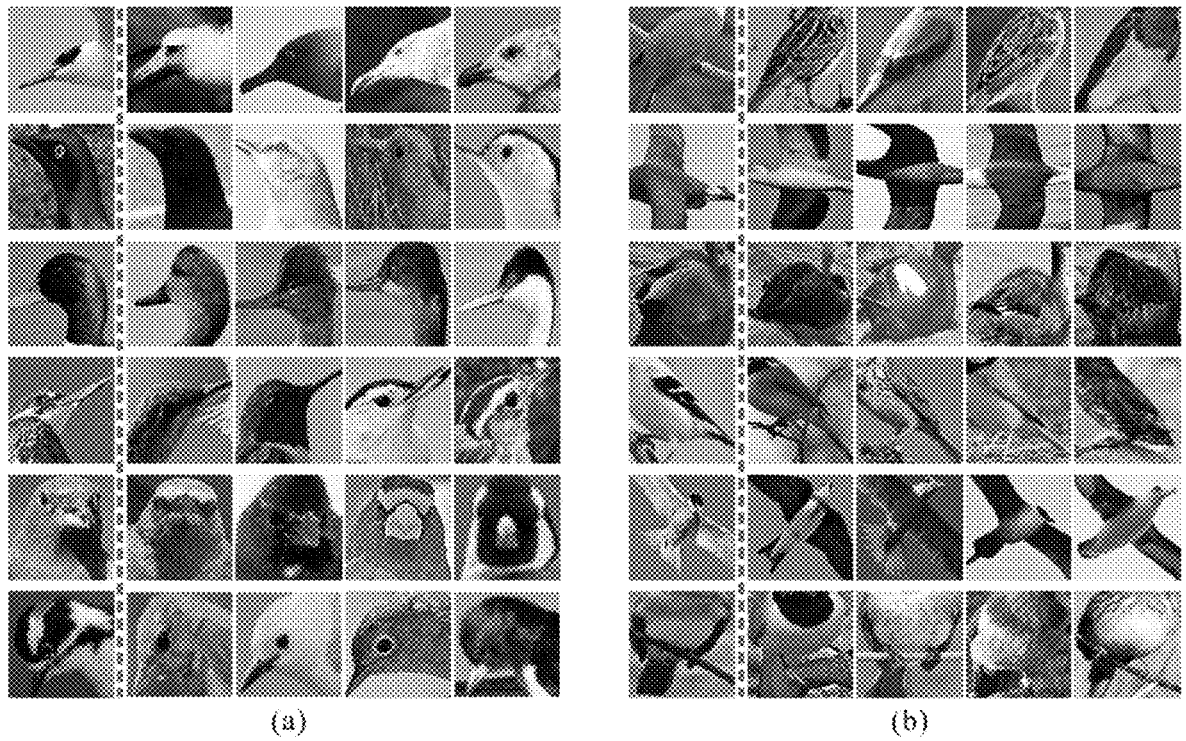
(a)  (b)
FIG. 5
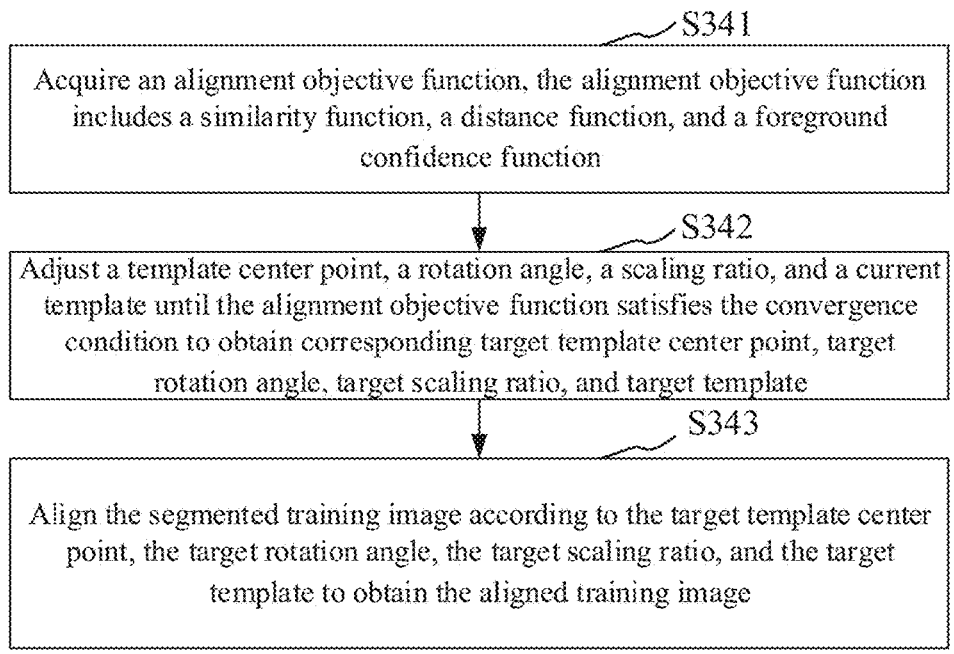

| methods | head | torso |
|---|---|---|
| localization w/o sharing | 93.2 | 94.3 |
| localization w/ sharing | 95.0 | 97.0 |

| methods | bg | fg | mIoU |
|---|---|---|---|
| segmentation w/o sharing | 82.8 | 81.0 | 81.9 |
| segmentation w/ sharing | 85.4 | 83.5 | 84.5 |

| methods | bg | fg | mIoU |
|---|---|---|---|
| segmentation w/o VLF | 80.7 | 79.0 | 79.9 |
| segmentation w/ VLF | 85.4 | 83.5 | 84.5 |

| CNN model | methods | head | torso |
|---|---|---|---|
| w/o CNN | Zhang et al. [63] | 68.2 | 79.8 |
| | Zhang et al. [64] | 63.8 | 89.1 |
| AlexNet | Lin et al. [35] | 74.0 | 96.0 |
| | Shih et al. [50] | 88.9 | 94.3 |
| VGGNet | Lin et al. [35] | 90.0 | 96.2 |
| | Zhang et al. [62] | 93.4 | 94.9 |
| | ours | 95.0 | 97.0 |

| methods | bg | fg | mIoU |
|---|---|---|---|
| GrabCut [46] | 61.6 | 64.3 | 63.0 |
| Co-segmentation [26] | 66.3 | 68.1 | 67.2 |
| FCN [52] | 79.6 | 78.0 | 78.8 |
| ours | 85.4 | 83.5 | 84.5 |

| methods | head | torso |
|---|---|---|
| w/o loc-seg | 76.3 | 76.3 |
| w/o VLF | 77.1 | 52.2 |
| w/o VLF-BP | 78.2 | 58.5 |
| w/o seg | 76.6 | 54.7 |
| full model | 79.5 | 63.3 |

| CNN model | methods | accuracy |
|---|---|---|
| w/o CNN | Lee et al. [24] | 41.0 |
| | Berg et al. [3] | 56.9 |
| | Goering et al. [17] | 57.8 |
| | Chai et al. [5] | 59.4 |
| | Gravves et al. [14] | 62.7 |
| AlexNet | Zhang et al. [65] | 65.0 |
| | Zhang et al. [63] | 76.4 |
| | Lin et al. [35] | 80.3 |
| VGGNet | Lin et al. [35] | 81.4 |
| | Lin et al. [36] | 84.1 |
| | Zhang et al. [62] | 85.1 |
| | ours (head) | 79.5 |
| | ours (torso) | 63.3 |
| | ours (head+torso) | 83.7 |
| | ours (whole image) | 76.3 |
| | ours (head+torso+whole image) | 88.5 |

FIG. 19

| methods | head | torso |
|---|---|---|
| w/o localization-segmentation | 63.7 | 63.7 |
| w/ localization-segmentation | 67.3 | 44.5 |
| LSAC | 70.2 | 49.1 |

FIG. 20

| CNN model | methods | accuracy |
|---|---|---|
| w/o CNN | Yao et al. [61] | 19.2 |
| | Khan et al. [27] | 22.4 |
| | Yang et al. [59] | 28.2 |
| | Angelova et al. [1] | 30.2 |
| | Deng et al. [10] | 32.8 |
| | Goering et al. [17] | 35.9 |
| | Farrell et al. [12] | 37.1 |
| | Chai et al. [5] | 47.3 |
| AlexNet | Lin et al. [35] | 65.3 |
| VGGNet | Zhang et al. [62] | 66.1 |
| | Lin et al. [35] | 66.5 |
| | ours (head) | 70.2 |
| | ours (torso) | 49.1 |
| | ours (head+torso) | 74.9 |
| | ours (whole image) | 63.7 |
| | ours (head+torso+whole image) | 77.5 |

| CNN model | methods | accuracy |
|---|---|---|
| w/o CNN | Chai et al. [5] | 78.0 |
| AlexNet | Girshick et al. [16] | 73.5 |
| | Lin et al. [35] | 82.4 |
| VGGNet | Girshick et al. [16] | 88.4 |
| | Lin et al. [36] | 91.3 |
| | Lin et al. [35] | 92.0 |
| | Krause et al. [29] | 92.6 |
| | ours | 96.3 |

METHOD FOR IMAGE CLASSIFICATION, COMPUTER DEVICE, AND STORAGE MEDIUM

CROSS-REFERENCE TO RELATED APPLICATION

This application is a U.S. 371 Application from PCT/CN2018/090370 filed Jun. 8, 2018, which claims priority to Chinese Patent Application No. 201810462613.5, filed with the Chinese Patent Office on May 15, 2018 and entitled "METHOD AND APPARATUS FOR IMAGE CLASSIFICATION, COMPUTER DEVICE, AND STORAGE MEDIUM", the entire contents of which are incorporated herein by reference.

TECHNICAL FIELD

The present application relates to the field of computer technology, and more particularly to a method for image classification, a computer device, and a storage medium.

BACKGROUND

The identification of the fine grain size emphasizes identifying fine error between the object classes of different shapes and poses. The purpose of fine-grain object identification is to identify the object class of a sub-object, which is configured to identify subtle errors between animals, product brands, and architectural styles.

Conventional classification methods use localization and alignment to reduce pose changes, since all steps are independently processed, so that each error occurring in localization can affect alignment and classification, and the accuracy of the fine-grain classification is affected.

SUMMARY

According to various embodiments of the present application, a method for image classification, a computer device, and a storage medium are provided.

A method for image classification includes:

a computer device acquiring a to-be-classified image and inputting the to-be-classified image to a trained image classification model, the trained image classification model includes a localization segmentation sub-network, an alignment sub-network, and a classification sub-network, the alignment sub-network is formulized as a valve linkage function, the image classification model is obtained by training by adjusting parameters of the localization segmentation sub-network and parameters of the classification sub-network by the valve linkage function, and in a forward-propagation phase of the training, an output of the valve linkage function is an aligned image; in a backward-propagation phase of the training, the output of the valve linkage function is a function with respect to a localization region and a segmentation region outputted by the localization segmentation sub-network;

the computer device subjecting the to-be-classified image through the localization segmentation sub-network for locating and segmenting a target object of the to-be-classified image to obtain a segmented image including a localization region and a segmentation region;

the computer device subjecting the segmented image through the alignment sub-network, the alignment sub-network aligning the target object to obtain an aligned image; and the computer device subjecting the aligned image through the classification sub-network for fine-grain classification to obtain a class corresponding to the to-be-classified image.

In an embodiment, the localization segmentation sub-network includes a localization sub-network and a segmentation sub-network that share parameters of a convolution neural network.

In an embodiment, a training step of the image classification model includes:

the computer device acquiring a training image set, each training image in the training image set includes a standard localization label box, a standard segmentation label box, and a standard category label;

the computer device acquiring a template corresponding to each class from the training image set;

the computer device inputting each training image in the training image set into the localization segmentation sub-network to obtain a segmented training image including a current localization region and a current segmentation region;

the computer device aligning the segmented training image according to the template to obtain an aligned training image;

the computer device inputting the aligned training image into a classification sub-network to obtain a corresponding current output class;

the computer device acquiring a total objective function corresponding to an image classification model, the total objective function includes an objective function of the localization segmentation sub-network and an objective function of a classification sub-network, the objective function of the localization segmentation sub-network is a function with respect to the valve linkage function; and calculating a value of the total objective function according to the current output class, the standard localization label box, the standard segmentation label box, and the standard category label;

the computer device adjusting the parameters of the localization segmentation sub-network and parameters of the classification sub-network according to the valve linkage function until the value of the total objective function satisfies a convergence condition; and the computer device obtaining the trained image classification model.

In an embodiment, the acquiring the template corresponding to each class from the training image set includes:

the computer device calculating a similarity between any two training images in the training image set to form a similarity matrix;

the computer device subjecting the similarity matrix through a spectral clustering algorithm to sort the training images into a plurality of corresponding clusters; and the computer device acquiring each cluster center, determining a target training image corresponding to each cluster and obtaining the template corresponding to each class according to a similarity between each training image in each cluster and a corresponding cluster center, and the template is configured to align an image.

In an embodiment, the aligning the segmented training image according to the template to obtain the aligned training image includes:

the computer device acquiring an alignment objective function, the alignment objective function includes a similarity function, a distance function, and a foreground confidence function;

the computer device adjusting a template center point, a rotation angle, a scaling ratio, and a current template until the alignment objective function satisfies the convergence condition to obtain corresponding target template center point, target rotation angle, target scaling ratio, and target template; and the computer device aligning the segmented training image according to the target template center point, the target rotation angle, the target scaling ratio, and the target template to obtain the aligned training image.

In an embodiment, the total objective function is defined by the following formula:

$$J(W_c, W_{ls}; I, L^{gt}, y^{gt}, o^{gt}) = E_c(W_c; V(L, O; I, L_f, O_f), y^{gt}) + E_{ls}(W_{ls}; I, L^{gt}, o^{gt})$$

J is a total objective function, $E_c$ represents an objective function of the localization segmentation sub-network, $E_{ls}$ represents an objective function of the classification sub-network, $W_c$ represents a parameter to be determined by the localization segmentation sub-network, $W_{ls}$ represents a parameter to be determined by the classification sub-network, V represents a valve linkage function, L is a localization region outputted by the localization segmentation sub-network, O is a segmentation region outputted by the localization segmentation sub-network, I is an inputted original image, $L_f$ is a localization region outputted by the localization segmentation sub-network in the forward process, $O_f$ is a segmentation region outputted by the localization segmentation sub-network in the forward process; I is an inputted original image, $y^{gt}$ is a standard category label, $L^{gt}$ is a standard localization label box, and $o^{gt}$ is a standard segmentation label box.

In an embodiment, the valve linkage function is defined by the following formula:

$$V(L, O; I, L_f, O_f) = \frac{E_a(c^*, \theta^*, \alpha^*, t^*; I, L, O)}{E_a(c^*, \theta^*, \alpha^*, t^*; I, L_f, O_f)} I(c^*, \theta^*, \alpha^*),$$

V is the valve linkage function, L is a localization region outputted by the localization segmentation sub-network, O is a segmentation region outputted by the localization segmentation sub-network, in the forward process, $L=L_f$, $O=O_f$, in the backward process, L and O are variables, I is an input original image and is a variable in the forward process, and $L_f$ is a localization region outputted by the localization segmentation sub-network in the forward process; $O_f$ is a segmentation region outputted by the localization segmentation sub-network in the forward process, $c^*$ is a template center point used for alignment, $\theta^*$ is a rotation angle used for alignment, and $\alpha^*$ is a target scaling ratio used for alignment, I represents an image after alignment on the original image, $E_a$ is an alignment energy function, the alignment energy function is defined by the following formula:

$$E_a(c, \theta, \alpha, t; I, L, O) = S(I(c, \theta, \alpha), t) + \lambda_d D(c, L) + \lambda_s F(O, t_m),$$

c represents a template center point, $\theta$ represents a rotation angle, $\alpha$ represents a target scaling ratio, t represents a template, S represents a similarity function, $\lambda_d$ and $\lambda_s$ are customized constants, D is a distance function, F is a foreground confidence function, and $t_m$ is a binary mask of the template.

A computer device, including a memory and a processor, the memory storing computer-readable instructions which, when executed by the processor, causing the processor to perform the steps of:

acquiring a to-be-classified image and inputting the to-be-classified image to a trained image classification model, the trained image classification model includes a localization segmentation sub-network, an alignment sub-network, and a classification sub-network, the alignment sub-network is formulated as a valve linkage function, the image classification model is obtained by training by adjusting parameters of the localization segmentation sub-network and parameters of the classification sub-network by the valve linkage function, and in a forward-propagation phase of the training, an output of the valve linkage function is an aligned image; in a backward-propagation phase of the training, the output of the valve linkage function is a function with respect to a localization region and a segmentation region outputted by the localization segmentation sub-network;

subjecting the to-be-classified image through the localization segmentation sub-network for locating and segmenting a target object of the to-be-classified image to obtain a segmented image including a localization region and a segmentation region;

subjecting the segmented image through the alignment sub-network, the alignment sub-network aligning the target object to obtain an aligned image; and subjecting the aligned image through the classification sub-network for fine-grain classification to obtain a class corresponding to the to-be-classified image.

One or more non-transitory storage medium storing computer-readable instructions which, when executed by one or more processors, causing one or more processors to perform the steps of:

acquiring a to-be-classified image and inputting the to-be-classified image to a trained image classification model, the trained image classification model includes a localization segmentation sub-network, an alignment sub-network, and a classification sub-network, the alignment sub-network is formulated as a valve linkage function, the image classification model is obtained by training by adjusting parameters of the localization segmentation sub-network and parameters of the classification sub-network by the valve linkage function, and in a forward-propagation phase of the training, an output of the valve linkage function is an aligned image; in a backward-propagation phase of the training, the output of the valve linkage function is a function with respect to a localization region and a segmentation region outputted by the localization segmentation sub-network;

subjecting the to-be-classified image through the localization segmentation sub-network for locating and segmenting a target object of the to-be-classified image to obtain a segmented image including a localization region and a segmentation region;

subjecting the segmented image through the alignment sub-network, the alignment sub-network aligning the target object to obtain an aligned image; and subjecting the aligned image through the classification sub-network for fine-grain classification to obtain a class corresponding to the to-be-classified image.

The details of at least an embodiment of the present disclosure will be presented with reference to the following drawings and description. Other characteristic and advantages of the present disclosure will be more apparent from the specification, drawings and claims.

BRIEF DESCRIPTION OF THE DRAWINGS

To illustrate the technical solutions according to the embodiments of the present disclosure or in the prior art more clearly, the accompanying drawings for describing the embodiments or the prior art are introduced briefly in the following. Apparently, the accompanying drawings in the following description are only some embodiments of the present disclosure, and persons of ordinary skill in the art can derive other drawings from the accompanying drawings without creative efforts.

FIG. 5 is a schematic diagram of a training image of a bird head and a bird torso according to an embodiment, in which an image selected as a template is displayed in the first column of FIGS. 5(a) and 5(b).

FIG. 19 is a schematic diagram of results of comparison of the final classification accuracy of the present application with other frontier methods on the CUB-200-2011 dataset.

FIG. 20 is a schematic diagram of classification accuracy of a head and a torso semantic parts in different methods in the CUB-200-2010 dataset.

DETAILED DESCRIPTION OF THE EMBODIMENTS

The present disclosure will be described in details in combination with the accompanying drawings and embodiments such that the technical solution and advantages of the present disclosure will be more apparent. It should be understood that the particular embodiments are described for the purpose of illustrating as opposed to restricting the present disclosure.

Figure 1:
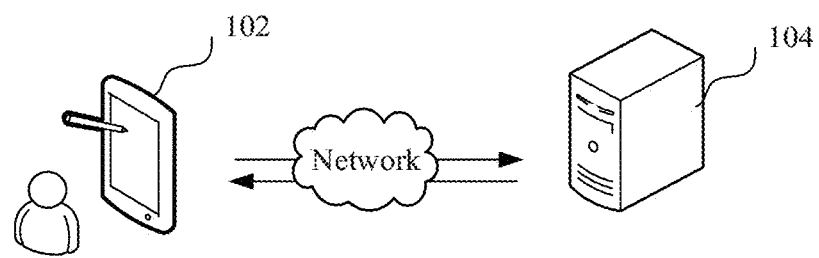
FIG. 1 is a schematic diagram of an application environment of a method for image classification according to an embodiment.

The method for image classification provided in the present application may be applied to the application environment shown in FIG. 1. The terminal 102 communicates with the server 104 via the network. The terminal may acquire the to-be-classified image inputted by the user, send the to-be-classified image to the server 104 for classification, or directly at the terminal 102 for classification. The terminal 102 may, but is not limited to, be a variety of personal computers, notebooks, smartphones, tablets, and portable wearable devices, and the server 104 may be implemented with a separate server or server cluster composed of multiple servers.

Figure 2:
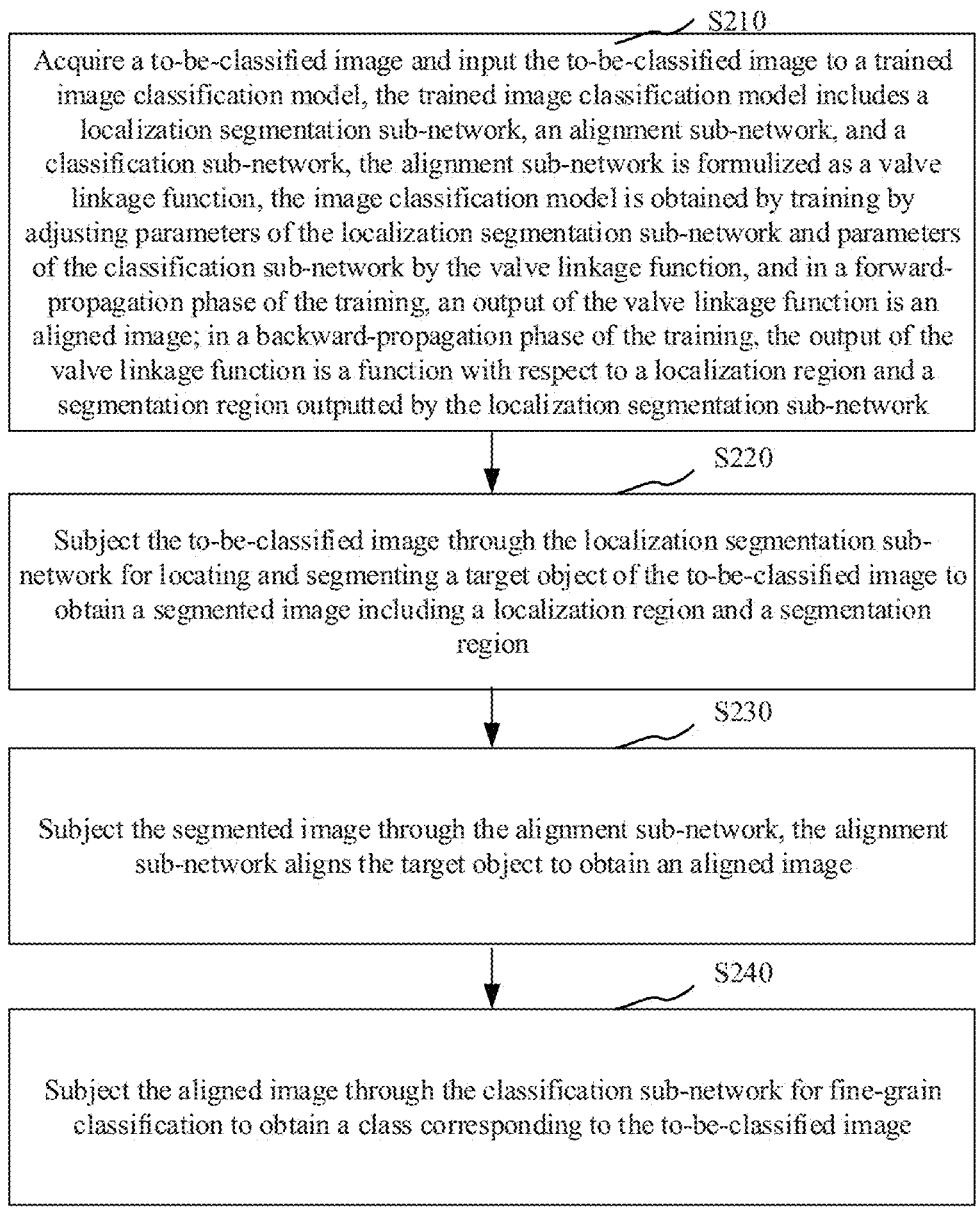
FIG. 2 is a flow chart of a method for image classification according to an embodiment.

In an embodiment, as shown in FIG. 2, there is provided a method for image classification, which is exemplified by the application of the method to the terminal or server of FIG. 1, including the following steps.

At step S210, acquire a to-be-classified image and input the to-be-classified image to a trained image classification model, the trained image classification model includes a localization segmentation sub-network, an alignment sub-network, and a classification sub-network, the alignment sub-network is formulized as a valve linkage function, the image classification model is obtained by training by adjusting parameters of the localization segmentation sub-network and parameters of the classification sub-network by the valve linkage function, and in a forward-propagation phase of the training, an output of the valve linkage function is an aligned image; in a backward-propagation phase of the training, the output of the valve linkage function is a function with respect to a localization region and a segmentation region outputted by the localization segmentation sub-network.

The to-be-classified image is an image that needs to be specified with a fine-grain class. The to-be-classified image may be an image acquired in real time, or may be an image acquired from a stored file. The image classification model is configured to classify the input image into fine-grain classes, and output a corresponding classification result. Pre-processing may be performed on the to-be-classified image, such as harmonizing the resolutions of the to-be-classified images.

The localization segmentation sub-network is configured to obtain the localization region and the segmentation region, the localization segmentation sub-network may be composed of a localization sub-network and a segmentation sub-network that are interrelated with each other, or may be composed of a localization sub-network and a segmentation sub-network that are independent of each other. Interrelated means that the training processes of the two sub-networks are harmonized, which is obtained from the interrelated training, such as with shared parameters etc. The localization sub-network outputs a basic localization of the target object, which may be displayed by the localization box. The segmentation sub-network generates a segmentation at a pixel level for the target object and background by preforming of a two-class regression.

The alignment sub-network is formulized as a valve linkage function, in the backward-propagation phase of the training, the output of the valve linkage function is a function with respect to the localization region and the segmentation region outputted by the localization segmentation sub-network, an alignment module based on a localization result and a segmentation result is formed. The image classification model is trained by adjusting the parameters of the localization segmentation sub-network and parameters of the classification sub-network by the valve linkage function which provides that the localization segmentation sub-network, the alignment sub-network, and the classification sub-network are integrated in the training phase; in the forward-propagation phase of the training, the output of the valve linkage function is an aligned image, such that the alignment is combined with other sub-networks based on the components of the deep convolution neural network.

Specifically, the objective function of the image classification model may be defined as a function associated with a valve linkage function, a classification sub-network parameter, and the valve linkage function is in turn a function of a localization region and a segmentation region associated with an output of the localization segmentation sub-network, the localization region and the segmentation region outputted by the localization segmentation sub-network are related to the parameters of the localization segmentation sub-network, so that during training, the parameters of the localization segmentation sub-network and the parameters of the classification sub-network are adjusted by the valve linkage function. The specific definition of the valve linkage function may be customized as needed on the basis of satisfying the above-described constraints. A valve linkage function is added to the image classification model as a bridge between the localization segmentation sub-network and the classification module. At the time of training, this function adaptively controls the propagation of the update signal from the classification module to the localization segmentation sub-network.

At step S220, subject the to-be-classified image through the localization segmentation sub-network for locating and segmenting a target object of the to-be-classified image to obtain a segmented image including a localization region and a segmentation region.

Specifically, the to-be-classified image is subjected to the localization sub-network in the localization segmentation sub-network to output localization region, which may be a border box including $(x_1, y_1)$, $(x_2, y_2)$, $x_1$, $x_2$ are lateral starting coordinate and lateral ending coordinate of the border box, $y_1$, $y_2$ are longitudinal starting coordinate and longitudinal ending coordinate of the border box. The image including the localization region is further subjected to the segmentation sub-network in the localization segmentation sub-network to generate an object region at a pixel level to obtain the segmented image.

At step S230, subject the segmented image through the alignment sub-network, the alignment sub-network aligns the target object to obtain an aligned image.

Specifically, the alignment sub-network obtains the localization result L and the segmentation result O of the object localization from the localization network and segmentation network, then performs template alignment, and supplies the coordinate-aligned image to the classification sub-network. The template alignment is an alignment process, the number of templates may be one or more, and pose changes may be managed by multiple template selections.

The alignment requires solving of the parameters, including the target template center point, the target rotation angle, the target scaling ratio, and the target template. In solving the parameters, a similarity function, a distance function, and a foreground confidence function are obtained first, and then a corresponding known value is added to the function, and by adjusting the template center point, the rotation angle, the scaling ratio, and the template, the objective function composed of the above functions satisfies the convergence condition, so that the target template center point, the target rotation angle, the target scaling ratio, and the target template are obtained. Thus, through the target template, the segmented image is subjected to a rotation of the target rotation angle and a scaling of the target scaling ratio to obtain an aligned image.

At step S240, subject the aligned image through the classification sub-network for fine-grain classification to obtain a class corresponding to the to-be-classified image.

Specifically, the aligned image is subjected to the classification sub-network and a corresponding category label to obtain a fine-grain class corresponding to the corresponding to-be-classified image.

In this embodiment, by acquiring the to-be-classified image, inputting the to-be-classified image into a trained image classification model including a localization segmentation sub-network, an alignment sub-network, and a classification sub-network, the alignment sub-network is formulized as a valve linkage function, and the image classification model is obtained by training by adjusting parameters of the localization segmentation sub-network and parameters of the classification sub-network by the valve linkage function; in a forward-propagation phase of the training, an output of the valve linkage function is an aligned image; in a backward-propagation phase of the training, the output of the valve linkage function is a function with respect to a localization region and a segmentation region outputted by the localization segmentation sub-network; the to-be-classified image is subjected to the localization segmentation sub-network for target object localization and segmentation to obtain a segmented image including the localization region and the segmentation region; the segmented image is subjected through the alignment sub-network, the alignment sub-network align the target object to obtain an aligned image; and the aligned image is subjected through the classification sub-network for fine-grain classification to obtain a class corresponding to the to-be-classified image, and the accuracy of the image classification can be improved.

In an embodiment, the localization segmentation sub-network includes a localization sub-network and a segmentation sub-network that share parameters of a convolution neural network.

Specifically, the localization sub-network and the segmentation sub-network share the parameters of the convolutional neural network, and the localization and the segmentation are trained jointly, the sharing of the convolutional neural network can generate a more accurate model, which is more accurate than the models separately obtained by the localization sub-network and the segmentation sub-network.

The localization sub-network includes a set of parameters $W_l$ and a regression value L outputted for the regression border box $(x_1, y_1)(x_2, y_2)$, with a given input image $I \in R^{h \times w \times 3}$, the border box regression value is $L=(x_1, y_1, x_2, y_2)$, the localization sub-network is represented as $L=f_l(W_l; I)$, $f_l$ represents the localization sub-network function, $W_l$ represents the parameter of the localization sub-network, and $L=(x_1, y_1, x_2, y_2)$ is the localization box.

A backward mapping $O(c_i)=P(o_i=1|c_i, W_s)$ is generated using the segmentation sub-network, 0 represents the background, 1 represents the foreground, and O represents the probability value of the pixel belonging to the foreground. The large probability means that the pixels are located inside an object region, and the backward mapping reduces the possibility that the alignment operation is applied to the background.

A set of parameters shared between the localization sub-network and the segmentation sub-network is expressed as $W_{ls}$. In an embodiment, we have formulized an objective function for localization and segmentation as:

$$E_{ls}(W_{ls}; I, L^{gt}, o^{gt}) = \frac{1}{2}\|f_l(W_{ls}; I) - L^{gt}\|^2 - \frac{1}{N}\sum_i \log P(o_i = o_i^{gt} \mid c_i, W_{ls})$$

$E_{ls}$ is an objective function of the localization segmentation sub-network, $f_l$ represents a localization sub-network function, l represents an input image, $L^{gt}$ represents a standard localization label box, $c_i$ represents a pixel, $o_i^{gt}$ represents a real value of the pixel $c_i$, $o_i$ represents a value of the pixel $c_i$; P represents a probability function, and N represents the total number of pixels of the input image. The loss values between localization and segmentation can be balanced by the objective function of the localization segmentation sub-network for which the localization sub-network and the segmentation sub-network share parameters. Part of the output of the localization sub-network and the segmentation sub-network is established on a set of base convolution layers. The features generated by the set of base convolution layers are shared by the localization sub-network and the segmentation sub-network for generating the localization coordinates and the segmentation result at a pixel level.

Figure 3:
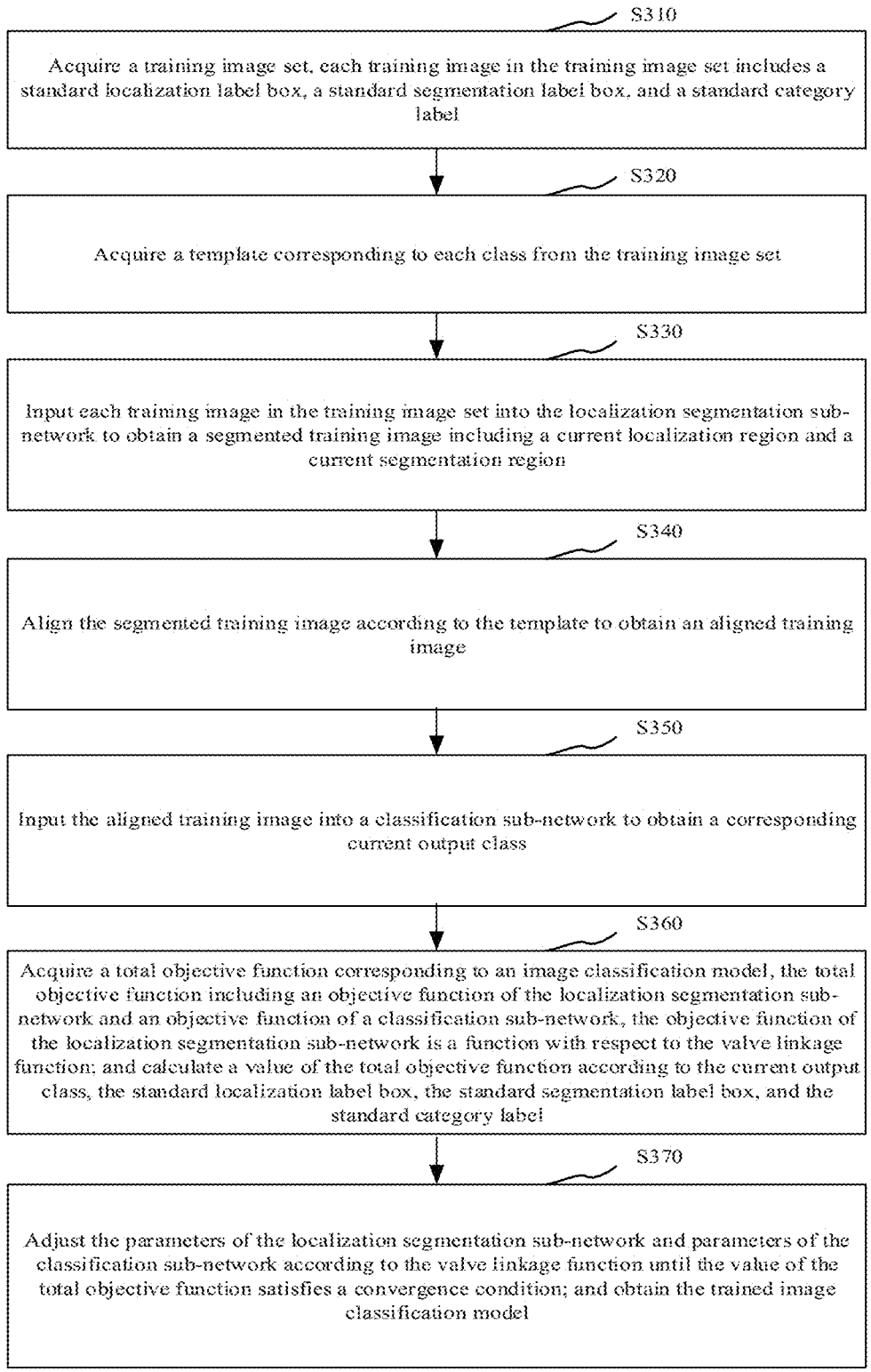
FIG. 3 is a flow chart of obtaining a trained image classification model according to an embodiment.

In an embodiment, as shown in FIG. 3, the training step of the image classification model includes:

At step S310, acquire a training image set, each training image in the training image set includes a standard localization label box, a standard segmentation label box, and a standard category label.

Specifically, the training image set includes a plurality of training images, each training image includes a standard localization label box, a standard segmentation label box, and a standard category label, the standard localization label box is configured to mark a real localization result, the standard segmentation label box is configured to mark a real segmentation result at a pixel level, and the standard category label is configured to mark a real classification result.

At step S320, acquire a template corresponding to each class from the training image set.

Specifically, a plurality of training images in the training image set may be clustered into different classes that use different corresponding templates for aligning the training images. The corresponding templates may be selected from the respective training images for the different classes according to the similarity between the respective training images corresponding to the different classes. The method of selecting the template may be customized as desired. The number of templates corresponding to each class is not limited and may be one or more.

At step S330, input each training image in the training image set into the localization segmentation sub-network to obtain a segmented training image including a current localization region and a current segmentation region.

Specifically, during training, the image classification model may be initialized by random parameters, and each training image in the training image set is inputted to the localization segmentation sub-network to obtain a segmented training image including the current localization region and the current segmentation region corresponding to the current parameter.

At step S340, align the segmented training image according to the template to obtain an aligned training image.

Specifically, the alignment process needs to adjust the template center point first, and then adjust the rotation angle and the scaling ratio of the image to be aligned according to the template after the template center point is adjusted. When there are a plurality of templates, the target template needs to be selected. The target template center point, the target rotation angle, the target scaling ratio, and the target template may be determined by a custom alignment objective function.

At step S350, input the aligned training image into a classification sub-network to obtain a corresponding current output class.

Specifically, the classification sub-network is the last module of the image classification model. The aligned training image is set as an input, represented as $I^* \in R^{h \times w \times 3}$. The classification convolution neural network is expressed as $y=f_c(W_c; I^*)$, $W_c$ is a parameter of the classification sub-network, $I^*$ is a pose-aligned part and is an aligned training image. $f_c$ is the function name of the classification sub-network and the output is a category label y. Throughout the training process, the standard category label is the desired tag, and the predicted category label y should be consistent with the standard category label. The aligned training image is inputted to the classification sub-network to obtain the current output prediction class corresponding to the current parameter.

At step S360, acquire a total objective function corresponding to an image classification model, the total objective function including an objective function of the localization segmentation sub-network and an objective function of a classification sub-network, the objective function of the localization segmentation sub-network is a function with respect to the valve linkage function; and calculate a value of the total objective function according to the current output class, the standard localization label box, the standard segmentation label box, and the standard category label.

Specifically, the total objective function is a function of the objective function of the localization segmentation sub-network and the objective function of the classification sub-network, and the alignment sub-network is formulized as a valve linkage function; in the forward process, the valve linkage function is configured to obtain the aligned image; in the backward process, in the backward-propagation phase of the training, the output of the valve linkage function is a function with respect to a localization region and a segmentation region outputted by the localization segmentation sub-network, and the valve linkage function is configured to adjust the parameters of the localization segmentation sub-network, such that the objective function of the localization segmentation sub-network and the classification sub-network are trained as a whole in the training phase. The valve linkage function is a function of the alignment energy function and the aligned image, the alignment energy function is a function with respect to the alignment objective function and the forward propagating energy, and the valve linkage function retains the function of the alignment energy; for this purpose, part of the variable localization and object mapping may be considered as input, which enables the update classification signal to be passed to the localization segmentation sub-network by a chain rule.

At step S370, adjust the parameters of the localization segmentation sub-network and parameters of the classification sub-network according to the valve linkage function until the value of the total objective function satisfies a convergence condition; and obtain the trained image classification model.

Specifically, the parameters of the localization segmentation sub-network and the parameters of the classification sub-network are parameters to be determined, the localization segmentation sub-network and the classification sub-network are balanced by two factors of 1 during training, and the localization segmentation sub-network and the classification sub-network are updated by minimizing the total objective function.

In the embodiment, when the image classification model is trained, the valve linkage function can adaptively balance the error between the classification and alignment, and the parameters of the localization segmentation sub-network and parameters of the classification sub-network can also be updated to determine more accurate model parameters.

Figure 4:
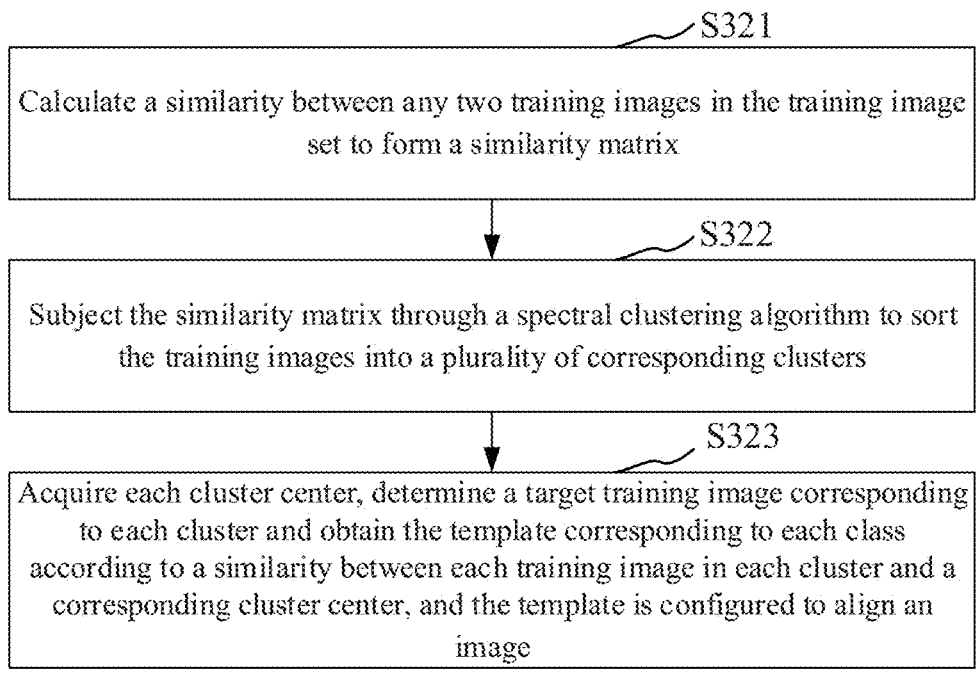
FIG. 4 is a flow chart of determining a template corresponding to a class according to an embodiment.

In an embodiment, as shown in FIG. 4, step S320 includes:

At step S321, calculate a similarity between any two training images in the training image set to form a similarity matrix.

Specifically, the similarity between any two training images is calculated by a similarity algorithm, the specific calculation method may be customized, for example, if the training image set includes N training images, the similarity between any two training images is calculated, a similarity matrix $R^{N \times N}$ is formed. In an embodiment, in calculating the similarity of the image $R_i$, $R_j$, in order to reduce the influence of the illumination change, the pixel values of each image are normalized, and the range of the pixels is quantized to 256 values and then calculated separately, for example, $P_i$, $P_j$, are two gray scale values that belong to $R_i$ and $R_j$. The normalization of the gray scale values and the calculation of the distribution values follow the structure of a normalized color histogram. $R_i$ and $R_j$ have the same size, every two pixels have the same position $R_i$ in and $R_j$, which forms a 2D tuple of gray scale values. By using this tuple, we calculate the joint distribution of the gray scale values of $R_i$ and $R_j$, represented by $P_{ij}$. According to this $P_i$, $P_j$, $P_{ij}$, a similarity function is defined:

$$S(R_i, R_j) = \sum_{m=1}^{M} \sum_{n=1}^{N} P_{ij}(m, n) \log\left(\frac{P_{ij}(m, n)}{P_i(m) P_j(n)}\right).$$

S represents a similarity function configured to measure whether or not the poses of the two images are similar, $R_i$, $R_j$ represent two images of the same size, $P_i$, $P_j$ respectively represent the gray scale value distribution of $R_i$ and $R_j$, which is similar to a frequency histogram, $P_{ij}$ represent a joint distribution of the gray scale values of $R_i$ and $R_j$, m, n represent pixel coordinate values, M and N represent the length and width of the image, respectively.

At step S322, subject the similarity matrix through a spectral clustering algorithm to sort the training images into a plurality of corresponding clusters.

Specifically, spectral clustering is a clustering algorithm that is more adaptable to data distribution, has excellent clustering effect, and has a much smaller calculation workload of clustering. The similarity matrix is subjected through a spectral clustering algorithm to segment each training image into a plurality of corresponding clusters.

At step S323, acquire each cluster center, determine a target training image corresponding to each cluster and obtain the template corresponding to each class according to a similarity between each training image in each cluster and a corresponding cluster center, and the template is configured to align an image.

Specifically, each cluster has a center, and we calculate the similarity between the training image in each cluster and the cluster center by means of the similarity function, so as to obtain the training images that are most similar to the cluster center, this training image is the template corresponding to this cluster, and one cluster corresponds to one class to obtain the template corresponding to each class. The template corresponding to one class may be one or more. As shown in FIG. 5, a schematic diagram of a training image is a bird head and a bird torso, and an image selected as a template is displayed in the first column of FIG. 5(a) and FIG. 5(b).

In the embodiment, the template corresponding to each class is obtained by calculating the similarity between the images and by adaptive calculation of clustering algorithm, and the template is dynamically selected, thereby improving the accuracy of the template selection.

Figure 6:
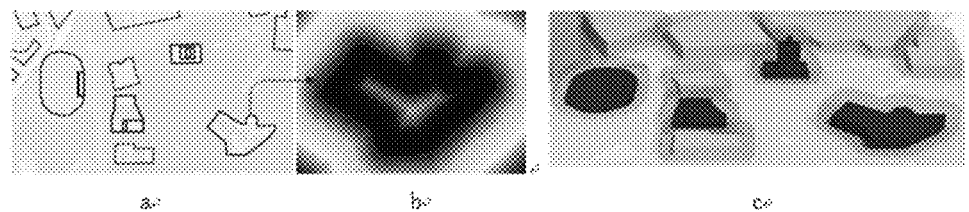
FIG. 6 is a flow chart of obtaining an aligned training image according to a template according to an embodiment.

In an embodiment, as shown in FIG. 6, step S340 includes:

At step S341, acquire an alignment objective function, the alignment objective function includes a similarity function, a distance function, and a foreground confidence function.

Figure 7:
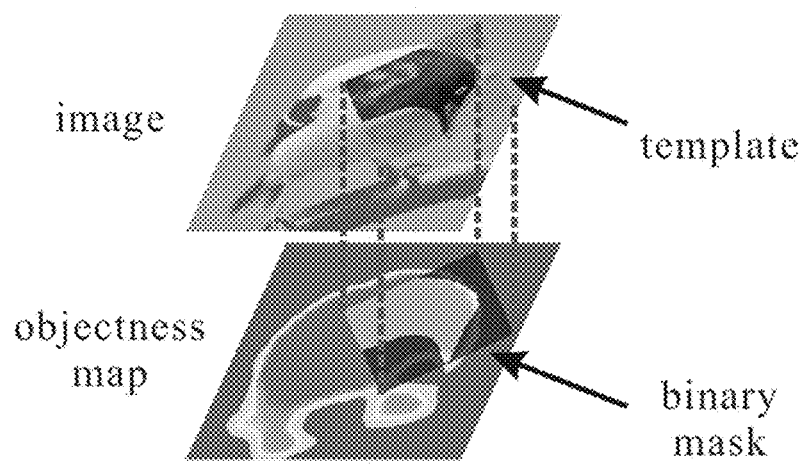
FIG. 7 is a schematic diagram of a foreground confidence diagram and a binary mask of an alignment part according to an embodiment.

Specifically, the alignment objective function is configured to determine the target template center point, the target rotation angle, the target scaling ratio, and the target template, the similarity function is configured to describe the similarity between the image to be aligned and the template, and the distance function is related to the distance between the template center point and the center point of the localization box of the output of the localization segmentation sub-network, the foreground confidence function is configured to describe the foreground confidence of the region covered by the template. By knowing the foreground shape of the object, when we align part of the region by the template, the influence of the background can be reduced, so that the foreground confidence of the alignment part covered by the template needs to be measured. As shown in FIG. 7, a foreground confidence diagram of the alignment section and a binary mask are shown.

In an embodiment, the distance function is defined by the formula $$c^r(L) = \left(\frac{x_1 + x_2}{2}, \frac{y_1 + y_2}{2}\right)$$

D(c, L) represents a distance function, c represents a template center point, L is a localization box for locating the output of the segmentation sub-network, and $c^r(L)$ represents a center point of the localization box for locating the output of the segmentation sub-network. σ is empirically customizable and set to 15 in an embodiment.

$$D(c, L) = \exp\left(-\frac{\|c - c^r(L)\|^2}{2\sigma^2}\right),$$

represents the center of the border box L.

The measurement of similarity is defined according to the distribution of pixel values, but the shape information of the critical object is missing, and the shape information of the object is described by the foreground confidence function. For the template t, a binary mask $t_m$ is given such that $t_m(c_i) \in \{0, 1\}$, this means that the pixel $c_i$ is a background or a foreground, and 0 or 1 represents a background and a foreground, respectively. For $c_i$, the scores of the foreground or background are calculated by using $O_f(c_i)$ and $O_b(c_i)$, respectively, and calculated as follows:

$$O_f(c_i) = -\log(1 - O(c_i)), O_b(c_i) = -\log O(c_i)$$

$O_f$ represents the foreground confidence of the pixel, $O_b$ represents the background confidence of the pixel, the higher the $O_f$ means that the pixel is more likely to be in the foreground, and the higher the $O_b$ means that the pixel is more likely to be in the background. Assuming that $t_m$ has a total of N pixels, including $N_f$ foreground point, $N_b$ background point, the foreground confidence is defined as follows:

$$F(O, t_m) = \frac{1}{N_f}\sum_{i=1}^{N} O_f(c_i)t_m(c_i) + \frac{1}{N_b}\sum_{i=1}^{N} O_b(c_i)(1 - t_m(c_i)).$$

F represents the foreground confidence of the area covered by the template, $t_m$ represents the binary mask of the template, $N_f$ represents the number of foreground pixels included in the binary mask of the template, and $N_b$ represents the number of background pixels included in the binary mask of the template. A portion of the region with high possibility to be foreground is located in the foreground region of the template while the template in which the background region and the foreground region overlap is suppressed. The foreground region can be better aligned by the guidance of the foreground confidence.

In an embodiment, the alignment objective function is defined as follows:

$$E_a(c,\theta,\alpha,t;I,L,O) = S(I(C,\theta,\alpha),t) + \lambda_d D(c,L) + \lambda_s F(O,t_m)$$

$E_a$ represents the alignment objective function, respectively, c, θ, α, t represent the parameters to be aligned, which are the template center point, the rotation angle, the scaling ratio, and the current template. In an embodiment, $\lambda_d$ and $\lambda_s$ are constants that are set to 0.001 and 0.003, respectively.

At step S342, adjust a template center point, a rotation angle, a scaling ratio, and a current template until the alignment objective function satisfies the convergence condition to obtain corresponding target template center point, target rotation angle, target scaling ratio, and target template.

Specifically, the target template center point, the target rotation angle, the target scaling ratio, and the target template are obtained by maximizing the alignment objective function. The larger the output of the alignment objective function, the more trustworthy the alignment.

At step S343, align the segmented training image according to the target template center point, the target rotation angle, the target scaling ratio, and the target template to obtain the aligned training image.

Figure 8:
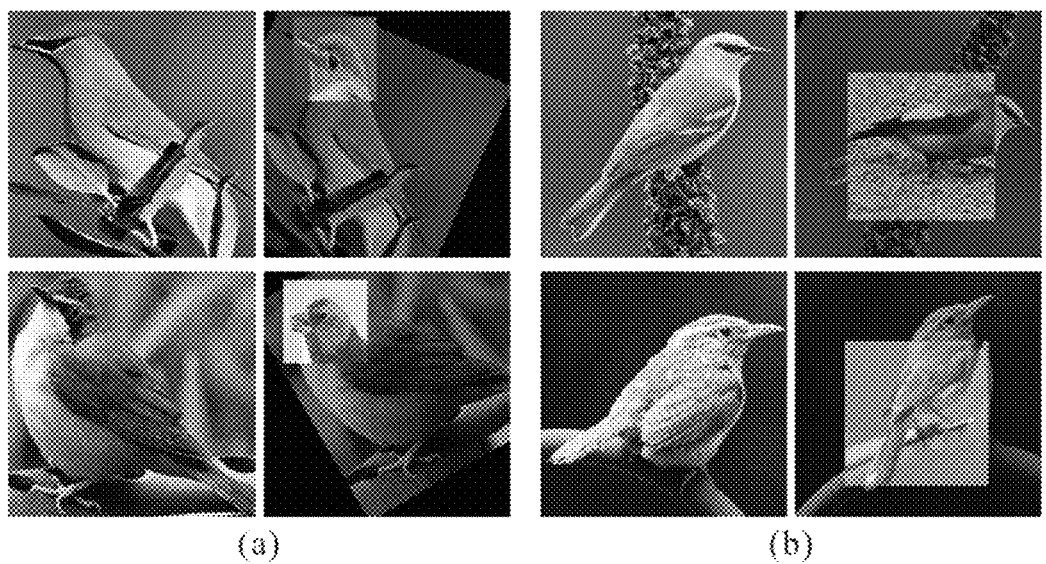
FIG. 8 is a schematic diagram of a comparison of an image before and after alignment according to an embodiment.

Specifically, after obtaining the target template center point, the target rotation angle, the target scaling ratio, and the target template, the segmented training image can be aligned to obtain the aligned training image. As shown in FIG. 8, which is a schematic diagram of image comparison before and after alignment according to an embodiment. In FIG. 8(a), a column on the left shows an image of the bird head not aligned, and a column on the right shows an image of the bird head aligned by a template. In FIG. 8(b), a column on the left shows an image of the bird torso not aligned, and a column on the right shows an image of the bird torso aligned by a template.

In the embodiment, the target template center point, the target rotation angle, the target scaling ratio, and the target template are obtained by dynamic calculation. The calculation algorithm takes into consideration the similarity, the center distance, and the foreground confidence, so that the alignment result is more trustworthy.

In an embodiment, the total objective function is defined by the following formula:

$$J(W_c,W_{ls};I,L^{gt},y^{gt},o^{gt}) = E_c(W_c;V(L,O;I,L_f,O_f),y^{gt}) + E_{ls}(W_{ls};I,L^{gt},o^{gt})$$

J is a total objective function, $E_c$ represents an objective function of the localization segmentation sub-network, $E_{ls}$ represents an objective function of the classification sub-network, We represents a parameter to be determined of the localization segmentation sub-network, $W_{ls}$ represents a parameter to be determined of the classification sub-network, V represents a valve linkage function, L is a localization region outputted by the localization segmentation sub-network, O is a segmentation region outputted by the localization segmentation sub-network, I is an inputted original image, $L_f$ is a localization region outputted by the localization segmentation sub-network in the forward process, $O_f$ is a segmentation region outputted by the localization segmentation sub-network in the forward process; I is an inputted original image, $y^{gt}$ is a standard category label, $L^{gt}$ is a standard localization label box, and $o^{gt}$ is a standard segmentation label box.

In an embodiment, the valve linkage function is defined by the following formula:

$$V(L, O; I, L_f, O_f) = \frac{E_a(c^*, \theta^*, \alpha^*, t^*; I, L, O)}{E_a(c^*, \theta^*, \alpha^*, t^*; I, L_f, O_f)} I(c^*, \theta^*, \alpha^*),$$

V is a valve linkage function, L is a localization region outputted by the localization segmentation sub-network, O is a segmentation region outputted by the localization segmentation sub-network; in the forward process, $L=L_f$, $O=O_f$, in the backward process, L and O are variables, I is an inputted original image, $L_f$ is a localization region outputted by the localization segmentation sub-network in the forward process; $O_f$ is a segmentation region outputted by a localization segmentation sub-network in the forward process, c* is a template center point used for alignment, θ* is a rotation angle used for alignment, α* is a target scaling ratio used for alignment, I represents an aligned image of the original image; $E_a$ is an alignment energy function, the alignment energy function is defined by the following formula:

$E_a$ (c, θ, α, t; I, L, O)=S(I(c, θ, α), t)+$\lambda_d$D(c, L)+$\lambda_s$F(O, $t_m$), c represents a template center point, θ represents a rotation angle, α represents a target scaling ratio, t represents a template, S represents a similarity function, $\lambda_d$ and $\lambda_s$ are custom constants, D is a distance function, F is a foreground confidence function, and $t_m$ is a binary mask of the template.

Specifically, the image of the original image after pose alignment is $I(c^*, \theta^*, \alpha^*)$, in the forward-propagation phase of the training, that is, in the forward process L and O are constants, in the backward-propagation phase of the training, L and O are variables. Where $$\{c^*, \theta^*, \alpha^*, t^*\} = \underset{c,\theta,\alpha,t}{\mathrm{argmax}} E_a(c, \theta, \alpha, t; I, L_f, O_f)$$

represents that $c^*$, $\theta^*$, $\alpha^*$, $t^*$ enables maximizing the alignment energy function. The valve linkage function balances three key conditions: 1) the alignment energy function, 2) the forward-propagation energy with respect to $L_f$ and $O_f$, and 3) the pose-aligned image.

In the forward-propagation phase, the input received by the alignment sub-network is $L_f$ and $O_f$, in the forward process L and O are constants, the alignment energy function and the forward-propagation energy are in the form of a ratio, in the forward-propagation phase, this ratio is 1, such that the output of the valve linkage function is $V(L_f, O_f; L, L_f, O_f) = I(c^*, \theta^* \alpha^*)$, that is, the output of the valve linkage function is an aligned image.

the valve linkage function kept the alignment energy function so that the update classification signal can be passed through the chain rule to the localization segmentation sub-network. In the backward-propagation phase, the output of the alignment sub-network $V(L_f, O; L, L_f, O_f)$ becomes a function of L and O. Thus, the total objective function of the image classification model is formulized as:

$$J(W_c, W_{ls}; I, L^{gt}, y^{gt}, o^{gt}) = E_c(W_c; V(L, O; I, L_f, O_f), y^{gt}) + E_{ls}(W_{ls}; I, L^{gt}, o^{gt})$$

By minimizing this objective function to update the localization segmentation sub-network and the classification sub-network, in order to update the classification sub-network, we calculate the gradient of J with respect to $W_c$. In order to update the localization segmentation sub-network, the gradient with respect to $W_{ls}$ is calculated as follows:

$$\nabla W_{ls} J = \frac{\partial E_{ls}}{\partial W_{ls}} + \frac{\partial E_c}{\partial W_{ls}}$$

$E_{ls}$ and $E_c$ respectively represent the training parameters of the localization segmentation sub-network and training parameters of the classification sub-network, and $$\frac{\partial E_{ls}}{\partial W_{ls}}$$

represents the backward-propagation phase within the localization segmentation.

$$\frac{\partial E_c}{\partial W_{ls}}$$

may be expanded as:

$$\frac{\partial E_c}{\partial W_{ls}} = \frac{\partial E_c}{\partial V} \left( \frac{\partial V}{\partial L} \frac{\partial L}{\partial W_{ls}} + \frac{\partial V}{\partial O} \frac{\partial O}{\partial W_{ls}} \right)$$

$$\frac{\partial E_c}{\partial V}$$

passes valid information in the backward-propagation phase of classification, the gradients $$\frac{\partial L}{\partial W_{ls}} \text{ and } \frac{\partial O}{\partial W_{ls}}$$

are configured to update the localization segmentation sub-network during the backward-propagation phase of the classification. According to the chain rule, the valve linkage function V is connected to the classification and localization segmentation sub-networks in the backward-propagation phase, specifically through $$\frac{\partial V}{\partial L} \text{ and } \frac{\partial V}{\partial O}$$

through. Since the connection is available, the update of the localization segmentation sub-network is sensitive to the backward-propagation signal of the classification.

Furthermore, the signal communication between the classification sub-network and the localization segmentation sub-network can be adaptively adjusted by the valve linkage function. In the backward-propagation phase, the valve linkage function V may be written as:

$$V(L, O; I, L_f, O_f) = \frac{1}{e} E_a(c^*, \theta^*, \alpha^*, t^*; I, L, O) I(c^*, \theta^*, \alpha^*)$$

$e = E_a(c^*, \theta^*, \alpha^*, t^*; I, L, O)$ is the alignment energy calculated in the forward-propagation. This forward-propagation alignment energy is applied so that the localization segmentation part is adaptively updated. The valve linkage function extracts information from the classification sub-network, and adaptively updates the localization segmentation part.

During the forward-propagation phase, the alignment energy is regarded as a constant in the BP phase. According to this energy, the connecting part $$\frac{\partial V}{\partial L}$$

may be expressed as:

$$\frac{\partial V}{\partial L} = \frac{1}{e} I(c^*, \theta^*, \alpha^*) \frac{\partial E_a}{\partial L}$$

$\frac{\partial E_a}{\partial L}$ is expanded to $$\frac{\partial E_a}{\partial L} = -\frac{\lambda_d}{2\sigma^2}\exp\left(-\frac{\|c-c^r(L)\|^2}{2\sigma^2}\right)\frac{\partial \|c-c^r(L)\|^2}{\partial L},$$

and $c=c_x, c_y$, also, $$\frac{\partial \|c-c^r(L)\|^2}{\partial L}(2c_x - x_1 - x_2, 2c_y - y_1 - y_2, 2c_x - x_1 - x_2, 2c_y - y_1 - y_2).$$

$\frac{1}{e}$ can be considered as a valve that controls the impact of the classification, and a large alignment score e corresponds to a better alignment in the forward-propagation phase. In the backward-propagation phase, $\frac{1}{e}$ is configured to re-set the weight for the update signals $\frac{\partial E_c}{\partial V}$ in the classification sub-network. The valve linkage function corresponds to balancing between classification and alignment errors.

In this case, a large e means a better alignment in the backward-propagation phase, the information from the classification sub-network is reduced to be $\frac{1}{e}$.

In contrast, if e is small, the alignment accuracy decreases. Thus, to facilitate the update of the localization segmentation sub-network, a proper $\frac{1}{e}$ can be set to introduce more classification information.

$\frac{1}{e}$ may be understood as a dynamic learning rate at the backward-propagation stage, which self-adaptively matches the performance.

The connection part of $\frac{\partial V}{\partial O}$ may be written as follows:

$$\frac{\partial V}{\partial O} = \frac{1}{e}I(c^*, \theta^*, \alpha^*)\frac{\partial E_a}{\partial O}.$$

The local partial derivative $\frac{\partial E_a}{\partial O}$ may be represented as follows:

$$\frac{\partial E_a}{\partial O(c_i)} = \frac{\lambda_s t_m(c_i)}{(1-O(c_i))N_f} - \frac{\lambda_s(1-t_m(c_i))}{O(c_i)N_b} \qquad (1)$$

Figures 9, 10, 11:
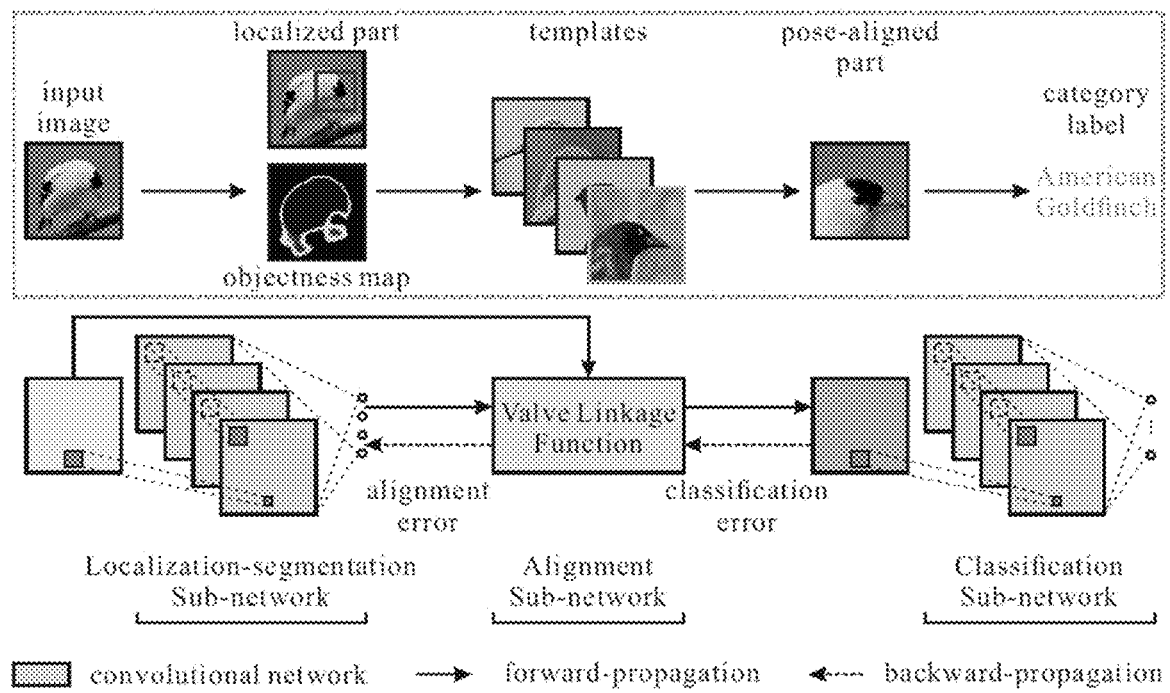
FIG. 9 is a schematic diagram of a processing process of an image classification system of a depth system according to an embodiment.
FIG. 10 is a schematic diagram of a comparison of part localization results according to an embodiment, in which a non-shared convolution neural network parameter and a parameter sharing are respectively set.
FIG. 11 is a diagram showing a comparison of a segmentation accuracy according to an embodiment, with and without sharing of convolution neural network parameters.

In addition to the adaptive factor $\frac{1}{e}$, the update of the segmentation is also guided by the template $t_m$, as specified by formula (1), under the definition of formula (1), the template under $t_m(c_i)=1$ allows $$\frac{\partial E_a}{\partial O(c_i)} = \frac{\lambda_s}{(1-O(c_i))N_f}$$

to supervise the segmentation operation. On the other hand, this signal becomes $$\frac{\partial E_a}{\partial O(c_i)} = -\frac{\lambda_s}{O(c_i)N_b}$$

when $t_m(c_i)=0$, which means that this control signal can be flexibly transformed through the foreground and background regions of the template. Since the template mask that matches part of the region is available, the network is not only supervised by the object region that reduces the global segmentation error, but also by the template shape information that corrects the object boundary. As shown in FIG. 10, it can be seen from the figure that the inclusion of additional shape information does improve the accuracy of the segmentation results. Since this self-adjusting mechanism is configured to connect classification and alignment at the valve linkage function, the localization segmentation sub-network can also be enhanced in the backward-propagation phase.

FIG. 9 is a schematic diagram of an embodiment of the processing of a depth system image classification system, which consists of three sub-networks of localization segmentation, alignment, and classification. Under the adjustment of the valve linkage function, in the forward-propagation phase, the alignment sub-network outputs a pose-aligned part image for the classification sub-network, while the errors of the classification and alignment can also be passed back to the localization segmentation sub-network in the backward-propagation phase.

Further, the present algorithm is evaluated on three datasets((1) Caltech-UCSD Bird-200-2011, (2) Caltech-UCSD Bird-200-2010, (3) StandfordCars-196). Since the (1) number dataset is more used in the analysis experiment. Thus, the main evaluation is implemented on the (1) number dataset and then compared to some recent techniques using two other datasets. The specific experimental procedure is as follows:

During implementation, the bird head and torso are considered to be semantic parts. Each of them was trained to obtain an image classification model by two depth systems. All convolutional neural network models are adjusted based on VGG-16 networks. In the localization segmentation sub-network, all input images are initialized to a size of 224×224. The original full connection layer is deleted. A structure is outputted, which is a localization border box and a pixel probability map for foreground and background labels. When training the model, the localization segmentation sub-network is first initialized, where the input of the classification sub-network is an image of 224×224. The first full connection layer is extended to features of 4096 dimensions. Then, a support vector machine classifier is trained by the features extracted through the convolution neural network.

For the alignment operation, in the template selection, all of the 5994 part labelling for the head and torso in the (1) number dataset are used. These 5994 parts are cut to 224×224. The data were divided into 30 clusters using a spectral clustering algorithm. From each cluster, cluster regions adjacent to the cluster center and its mirror versions are selected as two templates. This operation culminates in the formation of 60 templates. The rotation angle θ is an integer in the range of [−60, 60] with a variation interval of 10°. All input images and templates are reset to a size of 224×224, the area to be aligned in the image is smaller than any template. In order to match the size of the area to be aligned and the template, the input image needs to be scaled up. An enlarged scale set {1.5, 2.7, 4.0, 7.7, 15.0} is provided for the head, and an enlarged scale set {1.2, 1.4, 2.0, 2.5, 3.5} is provided for the torso.

The adjustment takes place according to the template's search space, rotation angle, and scaling ratio in the performance of the verification set which contains 1000 images randomly selected from the training set. By extending the search space, a performance improvement is found. Thus, the use of the search space is maintained based on all the experimental manifestations. The result of the pose similarity function may be calculated in advance and stored, under the acceleration of the GPU, the pose similarity is calculated by traversing the entire pose position, the template, the scaling ratio, and the rotation angle, and each image takes only 5 seconds. Thus, the pose similarity can be swiftly found in the forward-propagation such that the training time for each image is 15 ms and the test time is 8 ms.

Our method was evaluated on the Caltech-UCSD Bird-200-2011 dataset. This dataset contains images of 11,788 birds divided into 200 sub-classes. Each image contains a standard localization segmentation label box and a standard category label. Throughout the training and testing process, we used the border boxes of the datasets to simplify the classification. Training and testing quadrangle localization, defining two semantic templates, dividing into head and torso. The labelled part is covered with a corresponding rectangle at the head and torso of the bird.

1) Localization Segmentation Sub-Network Analysis

In order to acquire a connection between an object and a part, the parameters of the convolution are shared in localization and segmentation. For the purpose of investigating the efficiency of the parameter sharing, the non-shared convolution neural network parameters and the parameter sharing are respectively set in the convolution neural network and compared, and the comparison results of part localization results are shown in FIG. 10. In FIG. 10, the percentage of the correct localization part is calculated, which is calculated based on the top-ranking part localization, and the overlapping part≥0.5 with the real representation is considered correct. When the parameters of the convolution neural network are not shared, the correct rates of the localization results at the head and torso are 93.2 and 94.3, respectively, and better localization results at the head and torso are obtained by the segmentation with shared parameters, the accuracy rates are 95.0 and 97.0, respectively.

Figures 12, 13, 14:
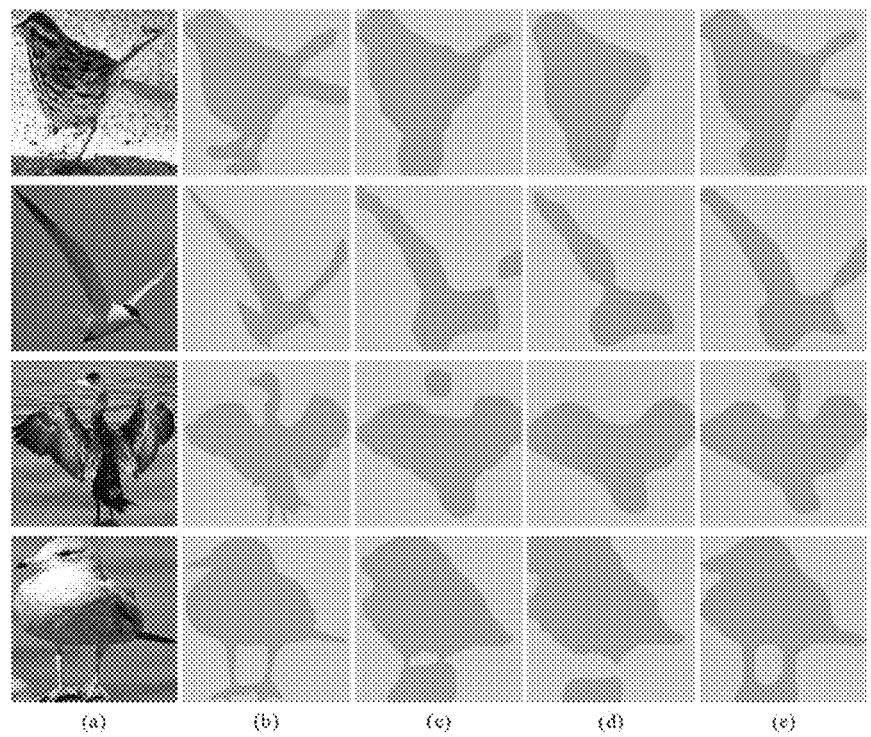
FIG. 12 is a schematic diagram of an input image and segmentation results in various cases according to an embodiment.
FIG. 13 is a schematic diagram of a comparison of an object segmentation accuracy on CUB-200-2011 dataset, with and without valve linkage function.
FIG. 14 is a comparison of a localization accuracy in a head and a torso of a method of this application with other methods.

FIG. 11 shows the setting of non-shared convolution neural network parameters and parameter sharing in the convolution neural network, respectively, and compares the segmentation accuracy, the acronyms of "bg" and "fg" respectively represents the background and the foreground; the detection evaluation function score was used to evaluate the segmentation performance. An average detection evaluation function score is calculated to evaluate the overall segmentation accuracy. From the comparison result, it is demonstrated that the parameter sharing improves the segmentation accuracy on the foreground and the background region. As shown in FIG. 12, the input image and the segmentation results in various cases are shown, FIG. 12(*a*) represents the input image, FIG. 12(*b*) shows the real segmentation result, FIG. 12(*c*) shows the segmentation result without parameter sharing, FIG. 12(*d*) shows the segmentation result without a valve linkage function, FIG. 12(*e*) shows the segmentation result based on a depth system framework, it can be seen that the visual difference between FIG. 12(*c*) and FIG. 12(*e*) is quite apparent that the segmentation results including the valve linkage function are much more accurate.

To further understand the improved performance of the valve linkage function for localization segmentation, this sub-network is removed from the combined depth system module and then compared to the complete depth system.

In FIG. 8, a comparison of the localization accuracy is shown, and the performance is tested with respect to the percentage of the correct part localization with the overlapping portion greater than 0.5, 0.6, and 0.7. In all configurations, the localization branch is a little worse than the performance of the depth system model. By comparison, in a system that removed the valve linkage function, the segmentation sub-network is also subject to performance degradation, as shown in FIG. 13, object segmentation accuracy with and without the valve linkage function on the CUB-200-2011 dataset are illustrated, and FIG. 12(*d*) shows the segmentation result. The reason for the performance degradation is that, in the absence of the valve linkage function, the localization segmentation sub-network does not get feedback from the alignment and classification operations, and the depth system in which the valve linkage function exists updates the alignment and classification during the iteration, such that the results are more accurate.

In order to evaluate the performance of part localization, the results of comparing the localization accuracy of the method of this application with that of other methods at the head and torso are shown in FIG. 14, and we use the structure of VGG-6. With the same experimental settings, the comparison results are shown in FIG. 14.

Figures 15, 16:
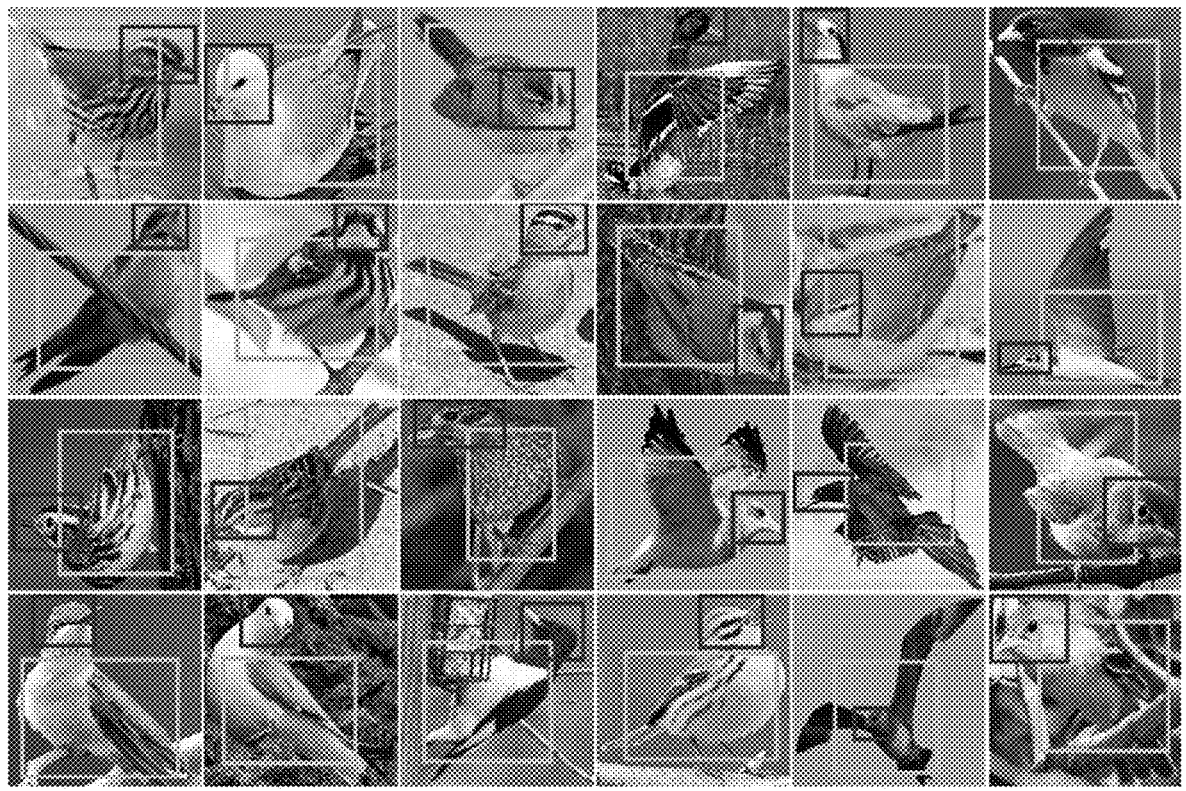
FIG. 15 is a schematic diagram of a localization of a prediction border box including a head and a torso according to an embodiment.
FIG. 16 is a schematic diagram of a comparison of a method of this application with other segmentation methods in relation to object segmentation on the CUB-200-2011 dataset.

For head and torso sites, the results of this application are 95.0 and 97.0 compared to the previous best results 93.4 and 96.2. FIG. 15 shows some examples of prediction boundaries including heads and torsos. Our depth system model improves performance in localization operations of the overall site compared to previous localization-alignment-segmentation models. Particularly, the localization of the head, changed due to the small area, is significantly increased from 90.0 to 95.0. The performance gap indicates the importance of the localization segmentation sub-network of the present application to capture the part relationship of the object, which is beneficial for the regression of the border box.

The depth model of the present application includes segmentation, and a reference full convolution neural network is trained for the segmentation of objects. In addition to solutions based on convolution neural networks, interactive object segmentation tools GrabCut and collaborative segmentation methods may be used. The segmentation accuracy of these methods are shown in FIG. 16, which indicates the comparison of the method of present application with other segmentation methods with respect to object segmentation on the CUB-200-2011 dataset.

Figures 17, 18:
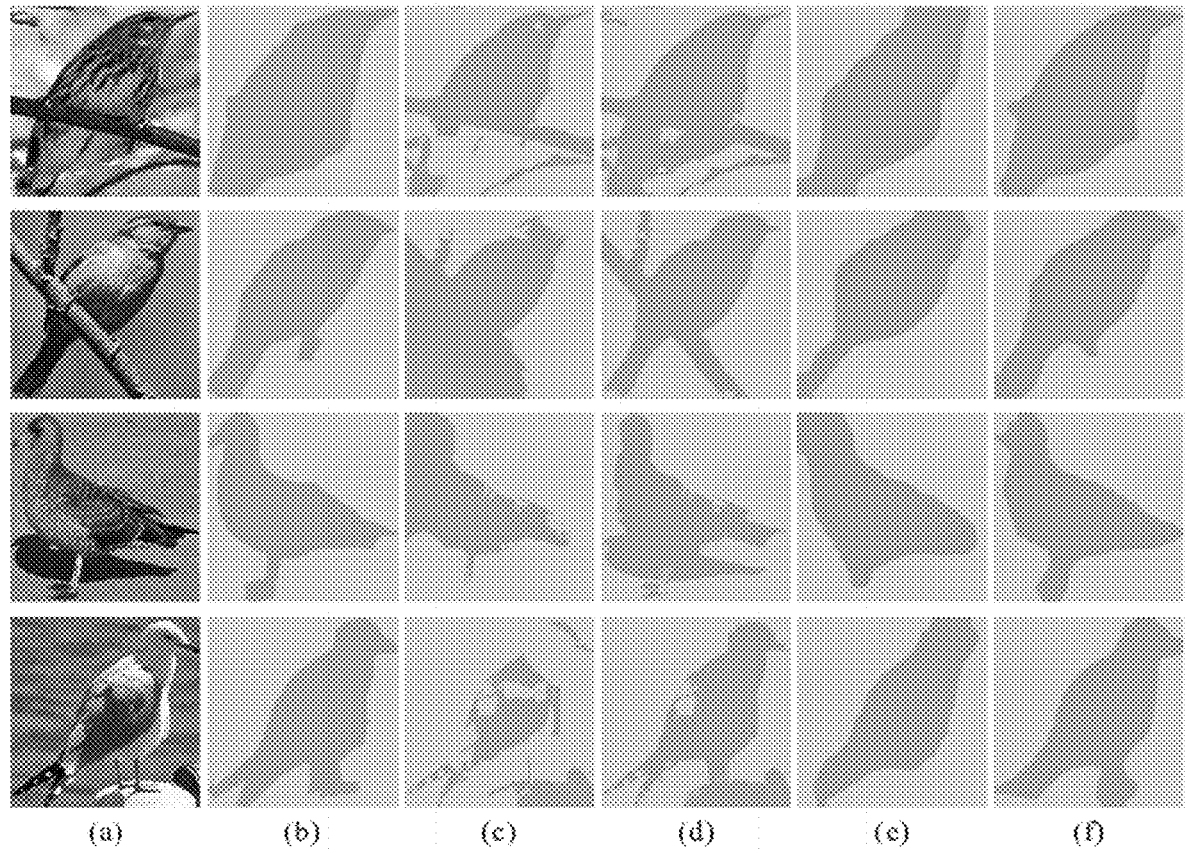
FIG. 17 is a schematic diagram of different segmentation results corresponding to different algorithms.
FIG. 18 is a schematic diagram of the classification accuracy of a head and a torso semantic parts of a bird in the CUB-200-2011 dataset.

As shown in FIG. 16, the average detection evaluation function score generated by the reference full convolution neural network is only 78.8 compared to the score 84.5 of the depth image classification model of the present application. This performance degradation derives from the reference full convolution neural network is not enhanced from the parameter sharing. For a method or the like that does not contain a convolutional neural network, GrabCut and a co-segmentation method, since they are dependent on a low-level image representation that lose semantic object information, they exhibit lower accuracy. FIG. 17 shows this, and FIG. 17 shows different schematic diagrams of segmentation results, FIG. 17(a) shows an input image, FIG. 17(b) shows a segmentation real result, and FIG. 17(c) shows a result of GrabCut, FIG. 17(d) shows the result of co-segmentation, FIG. 17(e) shows the segmentation result of the reference full convolution neural network, and FIG. 17(f) shows the segmentation result of the segmentation branch of the depth system of the present application.

2) Sub-Network Combined Analysis

The above experimental results show that the depth system framework associated with the three sub-networks performs well in part localization and object segmentation. We also evaluated the performance of the fine-grain classification and the experiments deleting one or two sub-networks in the following 5 cases.

First, the segmentation accuracy on the image is verified when the localization segmentation sub-network is deleted, and the verification result is displayed in the first line of FIG. 18, without this module, and the classification accuracy of the entire image is only 76.3; FIG. 18 shows the classification accuracy of the bird head and torso semantic portions in the CUB-200-2011 dataset, where the experimental performance is evaluated using a localization sub-network and an alignment sub-network, respectively.

Second, the alignment sub-networks are blocked in the depth system framework to block forward and backward-propagation. The localization segmentation sub-network is configured to propose partial assumptions for the classification, the remaining localization segmentation and classification modules are independently trained in the backward-propagation phase. The verification results of the second row in FIG. 18 indicate that the lack of information propagation during the alignment process is not desirable.

Third, the valve linkage function is used in the alignment sub-network to output the pose alignment part for the classification of the forward-propagation phase, but the valve linkage function is disabled in the backward-propagation phase to prevent the classification and alignment errors from backwardly propagating to the localization and segmentation. In this method, the accuracy of only 78.2 is achieved at the head of the bird. Therefore, the alignment sub-network is necessary during the forward and backward-propagation stages.

Fourth, the valve linkage function is enabled during the forward and backward processes. However, after the segmentation branches are removed, the framework is degraded to our previous localization alignment classification model, which consists of localization, alignment, and classification. Without segmentation branches, the localization results alone cannot suffice a representation as shown in the fourth row of FIG. 14. Unexpectedly, this model structure leads to performance degradation of the classification at the head and torso sites.

Fifth, using a complete depth system architecture, as shown in FIG. 18, the best score 79.5 is generated in the head identification, confirming that the depth system including the valve linkage function is well capable of fine-grain identification, in fact, the classification, localization and segmentation are also facilitated.

By replacing the entire image with the torso part, a large performance gap with respect to the classification accuracy is found (76.3VS52.2). In FIG. 14, the percentage of the high accuracy localization part with respect to torso localization shows that poor localization results in a slight performance gap. By comparing images that include more distinct heads, it is concluded that the torso of a bird is important in the species identification of birds, and the classification accuracy is promoted in the alignment sub-network by the classification of the torso of a bird. When the alignment and valve linkage function are added, the classification results are increased by 11.1. The description extracts better features of the torso parts, the reliable features of the torso part are important, which can combine the head with the entire image, which is advantageous for the final classification effect.

3) Global Comparison

FIG. 19 shows the results of comparison of the final classification accuracy of the present application with other frontier methods on the CUB-200-2011 dataset, the convolution neural network models used for all comparison methods are summarized in the first column of Table 8, the standard boundary box for the entire bird is given in the training and testing stages, all implementations are based on such a setting. In the system, each image is placed in a training network to extract the features of the head and torso parts.

Table 8 shows that the accuracy of 79.5 and 63.3 are obtained using the features of the head and torso sites, and that two feature vectors are connected to form a joint representation, resulting in an accuracy of 83.7. Finally, a deep convolution neural network model is fine-tuned based on a full diagram using a pre-training model. The sixth layer extracts features for an SVM classifier, acquiring an accuracy of 76.3. After connecting the features of the head, torso, and the whole image, the accuracy is increased to 88.5. By comparison, the method of [35], [62] also takes into account the head and torso, while combining the convolutional neural network features of the whole image. The improvement of the accuracy of the method of this application is mainly due to reliable localization, segmentation and alignment operations in the depth system framework using the valve linkage function.

4) Applying Caltech-UCSDBird-200-2010 Dataset

The Caltech-UCSDBird-200-2010 dataset provides a total of 6,033 images of 200 kinds of birds. The dataset does not provide a part annotation and contains only a few training sets and test sets. Thus, it is possible to verify the performance of the depth system framework trained on the Caltech-UCSDBird-200-2010 dataset on this dataset.

FIG. 20 shows the classification accuracy of the head and torso semantic part of different methods in the CUB-200-2010 dataset. The localization segmentation sub-network and the alignment sub-network are obtained by using a training set of Caltech-UCSDBir-200-2010 datasets. After the part image of the pose alignment is obtained, the classification sub-network is updated on this dataset.

The whole image classification accuracy corresponding to the method of this application is 63.7, and the classification accuracy of the bird head is 67.3 by localization-segmentation sub-networks. In this method, a performance enhancement of 3.6 is obtained. After combining the alignment operation, this magnitude of elevation becomes 6.5, and the best torso identification accuracy 49.1 is achieved by adding a localization, segmentation, and alignment operation.

Figures 21, 22:
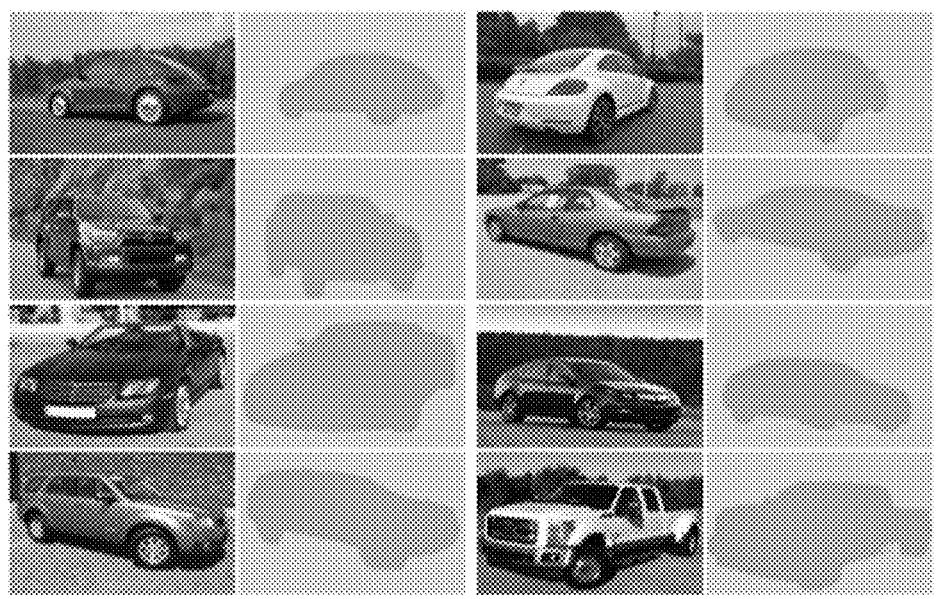
FIG. 21 is a diagram showing a comparison of classification accuracy between the method of the present application and other methods.
FIG. 22 is a schematic diagram of labelling a mask on a StandfordCars-96 dataset.

In the final experiment, the classification accuracy was compared to other methods and the results are shown in FIG. 21. In the method of [62], the result is 66.1 and in the localization-alignment-classification model of [35], the result is 66.5. The bird head of the method of this application shows 70.2 accuracy, and the combination of head and torso shows an accuracy of 74.9.

Similar to the previous experiments, the whole image is taken into consideration where, after combining all the features, the classification accuracy of the present application is increased to 77.5. The performance of the classification method of this application exceeds the previous best result and reaches a significant level. If part-labelling is configured to adjust local segmentation and align sub-networks, a better performance can be achieved in this dataset.

5) Applying 4StandfordCars-96 Dataset

Besides classification of bird kinds, the depth system image classification model of the present application may be applied to fine-grain identification of other object types. StandfordCars-96 dataset is used as an evaluation reference in this section. The vehicle's dataset contains 16,185 images from 196 classes, which is also prepared for fine-grain identification tasks, with a total of 8144 training images and 8041 test images. Different from the Caltech-UCSD Bird-200-2011 dataset, the StandfordCars-96 dataset does not provide object tasks. In order to facilitate the depth system image classification model on this dataset, we provide an additional binary mask of all vehicles of 16,185 images. FIG. 22 illustrates an example of mask labelling, which is an example of labelling a mask on a StandfordCars-96 dataset.

Figures 23, 24:
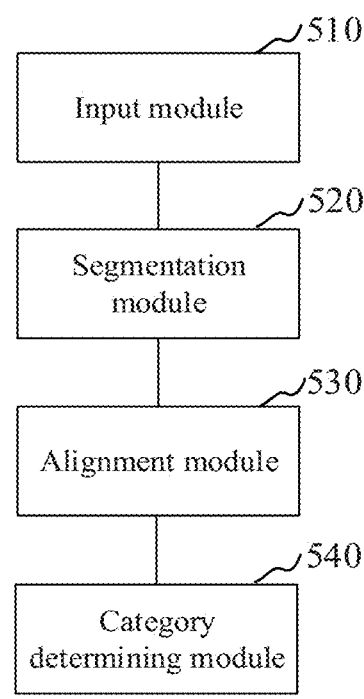
FIG. 23 is a schematic diagram of classification accuracy of the depth system of the present application and of other methods on the StanfordCars-96 dataset.
FIG. 24 is a block diagram of an apparatus for image classification according to an embodiment.

In FIG. 23, the depth system of the present application is compared to other methods over the classification accuracy on the StandfordCars-96 dataset. When the depth system image classification model of the present application is applied to the type of vehicle, in a case without any subdivided parts, localization, segmentation and alignment operations are performed on the vehicle. Similarly, the comparing method also uses the entire vehicle as an input. By using the VGG architecture, the prior best result is 92.6 corresponding to the method proposed in [29]. By using the same VGG structure to construct our depth system image classification model, a representation better than other methods is obtained. The result of 96.3 on the StandfordCars-96 data illustrates the depth system of the present application provides a more accurate classification of the vehicle.

It should be understood that although the steps in the flowcharts are sequentially displayed as indicated by arrows, these steps are not necessarily sequentially performed as indicated by arrows. Unless explicitly stated herein, the execution of these steps is not strictly sequential, and the steps may be performed in other sequences. Moreover, at least a part of the steps in the flowcharts may include a plurality of sub-steps or stages that are not necessarily performed at the same time, but may be performed at different times, and the order of execution of the sub-steps or stages is not necessarily performed sequentially, but may be performed in turn or alternately with at least a part of other steps or sub-steps or stages of other steps.

Figure 26:
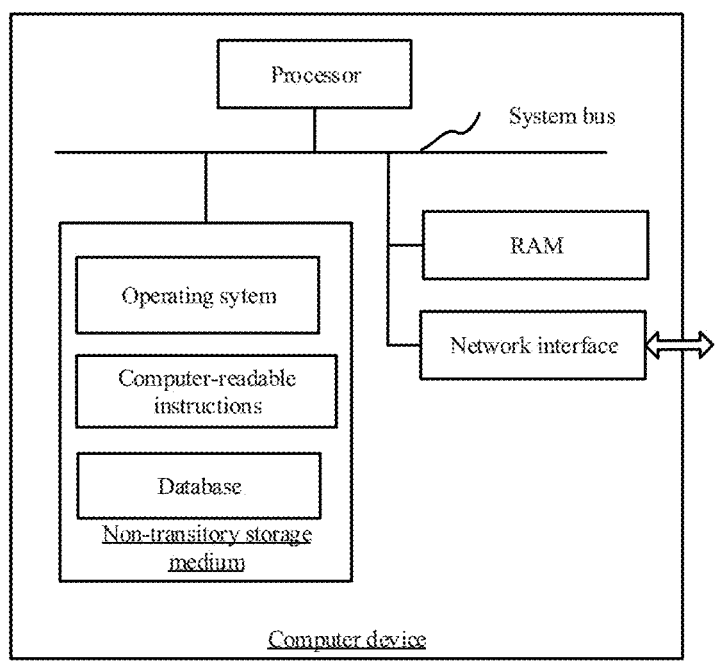
FIG. 26 is a schematic diagram of an internal structure of a computer device according to an embodiment.

In an embodiment, a computer device is also provided, the internal structure of which may be shown in FIG. 26, the computer device includes an image classification device including modules, each of the modules may be implemented in whole or in part by software, hardware, or combinations thereof.

In an embodiment, as shown in FIG. 24, an apparatus for image classification is provided, which includes:

An input module 510 configured to acquire a to-be-classified image and inputting the to-be-classified image to a trained image classification model, the trained image classification model includes a localization segmentation sub-network, an alignment sub-network, and a classification sub-network, the alignment sub-network is formulized as a valve linkage function, the image classification model is obtained by training by adjusting parameters of the localization segmentation sub-network and parameters of the classification sub-network by the valve linkage function, and in a forward-propagation phase of the training, an output of the valve linkage function is an aligned image; in a backward-propagation phase of the training, the output of the valve linkage function is a function with respect to a localization region and a segmentation region outputted by the localization segmentation sub-network.

The segmentation module 520 is configured to subject the to-be-classified image through the localization segmentation sub-network for locating and segmenting a target object of the to-be-classified image to obtain a segmented image including a localization region and a segmentation region.

The alignment module 530 is configured to subject the segmented image through the alignment sub-network, the alignment sub-network aligning the target object to obtain an aligned image.

The category determining module 540 is configured to subject the aligned image through the classification sub-network for fine-grain classification to obtain a class corresponding to the to-be-classified image.

In an embodiment, the localization segmentation sub-network includes a localization sub-network and a segmentation sub-network that share parameters of a convolution neural network.

Figure 25:
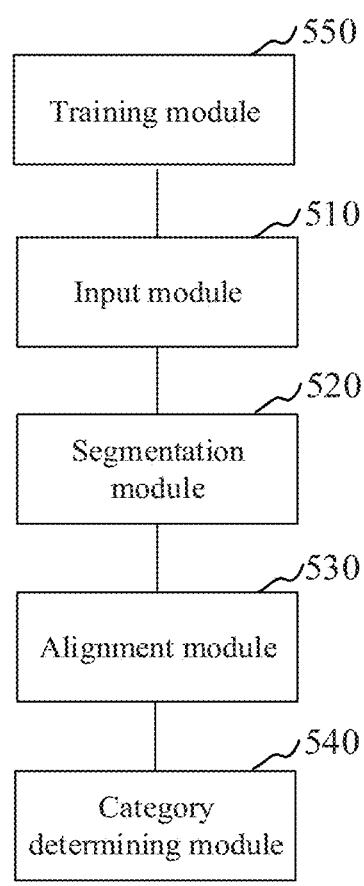
FIG. 25 is a block diagram of an apparatus for image classification according to another embodiment.

In an embodiment, as shown in FIG. 25, the apparatus further includes:

A training module 550 configured to acquire a training image set, each training image in the training image set includes a standard localization label box, a standard segmentation label box, and a standard category label; acquire a template corresponding to each class from the training image set; input each training image in the training image set into the localization segmentation sub-network to obtain a segmented training image including a current localization region and a current segmentation region; align the segmented training image according to the template to obtain an aligned training image; input the aligned training image into a classification sub-network to obtain a corresponding current output class; acquire a total objective function corresponding to an image classification model, the total objective function includes an objective function of the localization segmentation sub-network and an objective function of a classification sub-network, the objective function of the localization segmentation sub-network is a function with respect to the valve linkage function; and calculate a value of the total objective function according to the current output class, the standard localization label box, the standard segmentation label box, and the standard category label; adjust the parameters of the localization segmentation sub-network and parameters of the classification sub-network according to the valve linkage function until the value of the total objective function satisfies a convergence condition; and obtain the trained image classification model.

In an embodiment, the training module 550 is further configured to calculate a similarity between any two training images in the training image set to form a similarity matrix; subject the similarity matrix through a spectral clustering algorithm to sort the training images into a plurality of corresponding clusters; and acquire each cluster center, determine a target training image corresponding to each cluster and obtain the template corresponding to each class according to a similarity between each training image in each cluster and a corresponding cluster center, and the template is configured to align an image.

In an embodiment, the training module 550 is further configured to acquire an alignment objective function, the alignment objective function includes a similarity function, a distance function, and a foreground confidence function; adjust a template center point, a rotation angle, a scaling ratio, and a current template until the alignment objective function satisfies the convergence condition to obtain corresponding target template center point, target rotation angle, target scaling ratio, and target template; and align the segmented training image according to the target template center point, the target rotation angle, the target scaling ratio, and the target template to obtain the aligned training image.

In an embodiment, the total objective function is defined by the following formula:

$$J(W_c, W_{ls}; I, L^{gt}, o^{gt}) = E_c(W_c; V(L,O; I, L_f, O_f), y^{gt}) + E_{ls}(W_{ls}; I, L^{gt}, o^{gt})$$

J is a total objective function, $E_c$ represents an objective function of the localization segmentation sub-network, $E_{ls}$ represents an objective function of the classification sub-network, $W_c$ represents a parameter to be determined by the localization segmentation sub-network, $W_{ls}$ represents a parameter to be determined by the classification sub-network, V represents a valve linkage function, L is a localization region outputted by the localization segmentation sub-network, O is a segmentation region outputted by the localization segmentation sub-network, I is an inputted original image, $L_f$ is a localization region outputted by the localization segmentation sub-network in the forward process, $O_f$ is a segmentation region outputted by the localization segmentation sub-network in the forward process; I is an inputted original image, $y^{gt}$ is a standard category label, $L^{gt}$ is a standard localization label box, and $o^{gt}$ is a standard segmentation label box.

In an embodiment, the valve linkage function is defined by the following formula:

$$V(L, O; I, L_f, O_f) = \frac{E_a(c^*, \theta^*, \alpha^*, t^*; I, L, O)}{E_a(c^*, \theta^*, \alpha^*, t^*; I, L_f, O_f)} I(c^*, \theta^*, \alpha^*),$$

V is the valve linkage function, L is a localization region outputted by the localization segmentation sub-network, O is a segmentation region outputted by the localization segmentation sub-network, in the forward process, $L=L_f$, $O=O_f$, in the backward process, L and O are variables, I is an input original image and is a variable in the forward process, and $L_f$ is a localization region outputted by the localization segmentation sub-network in the forward process; $O_f$ is a segmentation region outputted by the localization segmentation sub-network in the forward process, $c^*$ is a template center point used for alignment, $\theta^*$ is a rotation angle used for alignment, and $\alpha^*$ is a target scaling ratio used for alignment, I represents an image after alignment on the original image, $E_a$ is an alignment energy function, the alignment energy function is defined by the following formula:

$$E_a(c, \theta, \alpha, t; I, L, O) = S(I(c, \theta, \alpha), t) + \lambda_d D(c, L) + \lambda_s F(O, t_m),$$

c represents a template center point, $\theta$ represents a rotation angle, $\alpha$ represents a target scaling ratio, t represents a template, S represents a similarity function, $\lambda_d$ and $\lambda_s$ are customized constants, D is a distance function, F is a foreground confidence function, and $t_m$ is a binary mask of the template.

The respective modules in the apparatus for image classification described above may be implemented in whole or in part by software, hardware, and combinations thereof. Each of the modules may be embedded in or independent of a processor in a computer device in a hardware form, or may be stored in a memory in a computer device in a software form, so that the processor invokes to perform operations corresponding to each of the modules described above.

In an embodiment, a computer device is provided, which may be a server, the internal structural of which may be shown in FIG. 26. The computer device includes a processor, memory, a network interface, and database connected via a system bus. The processor of the computer device is configured to provide calculating and control capabilities. The memory of the computer device includes a non-transitory storage medium and a random access memory (RAM). The non-transitory storage medium stores an operating system, computer-readable instructions, and a database. The RAM provides an environment for the operation of operating systems and computer programs in non-transitory storage medium. The database of the computer device is configured to store data. The network interface of the computer device is configured to communicate with an external terminal via a network connection. The computer-readable instructions are executed by the processor to implement the method for image classification described in the foregoing embodiments.

It will be appreciated by those skilled in the art that the structure shown in FIG. 26 is only a block diagram of a part of the structure associated with the present application and does not constitute a limitation on the computer device to which the present application is applied, the particular computer device may include more or fewer components than those shown in the figure, or combining certain components, or have different component arrangements.

In an embodiment, a computer device is provided, which includes a memory and a processor, the memory stores computer-readable instructions which, when executed by the processor, causes the processor to perform the steps of acquiring a to-be-classified image and inputting the to-be-classified image to a trained image classification model, the trained image classification model includes a localization segmentation sub-network, an alignment sub-network, and a classification sub-network, the alignment sub-network is formulized as a valve linkage function, the image classification model is obtained by training by adjusting parameters of the localization segmentation sub-network and parameters of the classification sub-network by the valve linkage function, and in a forward-propagation phase of the training, an output of the valve linkage function is an aligned image; in a backward-propagation phase of the training, the output of the valve linkage function is a function with respect to a localization region and a segmentation region outputted by the localization segmentation sub-network; subjecting the to-be-classified image through the localization segmentation sub-network for locating and segmenting a target object of the to-be-classified image to obtain a segmented image including a localization region and a segmentation region; subjecting the segmented image through the alignment sub-network, the alignment sub-network aligning the target object to obtain an aligned image; and subjecting the aligned image through the classification sub-network for fine-grain classification to obtain a class corresponding to the to-be-classified image.

In an embodiment, the localization segmentation sub-network includes a localization sub-network and a segmentation sub-network that share parameters of a convolution neural network.

In an embodiment, the training of the image classification model includes: acquiring a training image set, each training image in the training image set includes a standard localization label box, a standard segmentation label box, and a standard category label; acquiring a template corresponding to each class from the training image set; inputting each training image in the training image set into the localization segmentation sub-network to obtain a segmented training image including a current localization region and a current segmentation region; aligning the segmented training image according to the template to obtain an aligned training image; inputting the aligned training image into a classification sub-network to obtain a corresponding current output class; acquiring a total objective function corresponding to an image classification model, the total objective function includes an objective function of the localization segmentation sub-network and an objective function of a classification sub-network, the objective function of the localization segmentation sub-network is a function with respect to the valve linkage function; and calculating a value of the total objective function according to the current output class, the standard localization label box, the standard segmentation label box, and the standard category label; adjusting the parameters of the localization segmentation sub-network and parameters of the classification sub-network according to the valve linkage function until the value of the total objective function satisfies a convergence condition; and obtaining the trained image classification model.

In an embodiment, calculating a similarity between any two training images in the training image set to form a similarity matrix; subjecting the similarity matrix through a spectral clustering algorithm to sort the training images into a plurality of corresponding clusters; and acquiring each cluster center, determining a target training image corresponding to each cluster and obtaining the template corresponding to each class according to a similarity between each training image in each cluster and a corresponding cluster center, and the template is configured to align an image.

In an embodiment, the aligning the segmented training image according to the template to obtain the aligned training image includes: acquiring an alignment objective function, the alignment objective function includes a similarity function, a distance function, and a foreground confidence function; adjusting a template center point, a rotation angle, a scaling ratio, and a current template until the alignment objective function satisfies the convergence condition to obtain corresponding target template center point, target rotation angle, target scaling ratio, and target template; and aligning the segmented training image according to the target template center point, the target rotation angle, the target scaling ratio, and the target template to obtain the aligned training image.

In an embodiment, the total objective function is defined by the following formula:

$$J(W_c, W_{ls}; I, L^{gt}, y^{gt}, o^{gt}) = E_c(W_c; V(L, O; I, L_f, O_f), y^{gt}) + E_{ls}(W_{ls}; I, L^{gt}, o^{gt})$$

J is a total objective function, $E_c$ represents an objective function of the localization segmentation sub-network, $E_{ls}$ represents an objective function of the classification sub-network, $W_c$ represents a parameter to be determined by the localization segmentation sub-network, $W_{ls}$ represents a parameter to be determined by the classification sub-network, V represents a valve linkage function, L is a localization region outputted by the localization segmentation sub-network, O is a segmentation region outputted by the localization segmentation sub-network, I is an inputted original image, $L_f$ is a localization region outputted by the localization segmentation sub-network in the forward process, $O_f$ is a segmentation region outputted by the localization segmentation sub-network in the forward process; I is an inputted original image, $y^{gt}$ is a standard category label, $L^{gt}$ is a standard localization label box, and $o^{gt}$ is a standard segmentation label box.

In an embodiment, the valve linkage function is defined by the following formula:

$$V(L, O; I, L_f, O_f) = \frac{E_a(c^*, \theta^*, \alpha^*, r^*; I, L, O)}{E_a(c^*, \theta^*, \alpha^*, r^*; I, L_f, O_f)} I(c^*, \theta^*, \alpha^*),$$

V is the valve linkage function, L is a localization region outputted by the localization segmentation sub-network, O is a segmentation region outputted by the localization segmentation sub-network, in the forward process, $L=L_f$, $O=O_f$, in the backward process, L and O are variables, I is an input original image and is a variable in the forward process, and $L_f$ is a localization region outputted by the localization segmentation sub-network in the forward process; $O_f$ is a segmentation region outputted by the localization segmentation sub-network in the forward process, $c^*$ is a template center point used for alignment, $\theta^*$ is a rotation angle used for alignment, and $\alpha^*$ is a target scaling ratio used for alignment, I represents an image after alignment on the original image, $E_a$ is an alignment energy function, the alignment energy function is defined by the following formula:

$E_a(c, \theta, c, t; I, L, O)=S(I(c, \theta, \alpha), t)+\lambda_d D(c, L)+\lambda_s F(O, t_m)$, c represents a template center point, θ represents a rotation angle, α represents a target scaling ratio, t represents a template, S represents a similarity function, $\lambda_d$ and $\lambda_s$ are customized constants, D is a distance function, F is a foreground confidence function, and $t_m$ is a binary mask of the template.

In an embodiment, it provides one or more non-transitory storage medium storing computer-readable instructions which, when executed by one or more processors, cause one or more processors to perform the steps of: acquiring a to-be-classified image and inputting the to-be-classified image to a trained image classification model, the trained image classification model includes a localization segmentation sub-network, an alignment sub-network, and a classification sub-network, the alignment sub-network is formulized as a valve linkage function, the image classification model is obtained by training by adjusting parameters of the localization segmentation sub-network and parameters of the classification sub-network by the valve linkage function, and in a forward-propagation phase of the training, an output of the valve linkage function is an aligned image; in a backward-propagation phase of the training, the output of the valve linkage function is a function with respect to a localization region and a segmentation region outputted by the localization segmentation sub-network; subjecting the to-be-classified image through the localization segmentation sub-network for locating and segmenting a target object of the to-be-classified image to obtain a segmented image including a localization region and a segmentation region; subjecting the segmented image through the alignment sub-network, the alignment sub-network aligning the target object to obtain an aligned image; and subjecting the aligned image through the classification sub-network for fine-grain classification to obtain a class corresponding to the to-be-classified image.

In embodiment, the localization segmentation sub-network includes a localization sub-network and a segmentation sub-network that share parameters of a convolution neural network.

In embodiment, the training of the image classification model includes: acquiring a training image set, each training image in the training image set includes a standard localization label box, a standard segmentation label box, and a standard category label; acquiring a template corresponding to each class from the training image set; inputting each training image in the training image set into the localization segmentation sub-network to obtain a segmented training image including a current localization region and a current segmentation region; aligning the segmented training image according to the template to obtain an aligned training image; inputting the aligned training image into a classification sub-network to obtain a corresponding current output class; acquiring a total objective function corresponding to an image classification model, the total objective function includes an objective function of the localization segmentation sub-network and an objective function of a classification sub-network, the objective function of the localization segmentation sub-network is a function with respect to the valve linkage function; and calculating a value of the total objective function according to the current output class, the standard localization label box, the standard segmentation label box, and the standard category label; adjusting the parameters of the localization segmentation sub-network and parameters of the classification sub-network according to the valve linkage function until the value of the total objective function satisfies a convergence condition; and obtaining the trained image classification model.

In embodiment, the acquiring the template corresponding to each class from the training image set includes: calculating a similarity between any two training images in the training image set to form a similarity matrix; subjecting the similarity matrix through a spectral clustering algorithm to sort the training images into a plurality of corresponding clusters; and acquiring each cluster center, determining a target training image corresponding to each cluster and obtaining the template corresponding to each class according to a similarity between each training image in each cluster and a corresponding cluster center, and the template is configured to align an image.

In embodiment, the aligning the segmented training image according to the template to obtain the aligned training image includes: acquiring an alignment objective function, the alignment objective function including a similarity function, a distance function, and a foreground confidence function; adjusting a template center point, a rotation angle, a scaling ratio, and a current template until the alignment objective function satisfies the convergence condition to obtain corresponding target template center point, target rotation angle, target scaling ratio, and target template; and aligning the segmented training image according to the target template center point, the target rotation angle, the target scaling ratio, and the target template to obtain the aligned training image.

In an embodiment, the total objective function is defined by the following formula:

$$J(W_c, W_{ls}; I, L^{gt}, y^{gt}, o^{gt}) = E_c(W_c; V(L,O;I,L_f,O_f), y^{gt}) + E_{ls}(W_{ls}; I, L^{gt}, o^{gt})$$

J is a total objective function, $E_c$ represents an objective function of the localization segmentation sub-network, $E_{ls}$ represents an objective function of the classification sub-network, $W_c$ represents a parameter to be determined by the localization segmentation sub-network, $W_{ls}$ represents a parameter to be determined by the classification sub-network, V represents a valve linkage function, L is a localization region outputted by the localization segmentation sub-network, O is a segmentation region outputted by the localization segmentation sub-network, I is an inputted original image, $L_f$ is a localization region outputted by the localization segmentation sub-network in the forward process, $O_f$ is a segmentation region outputted by the localization segmentation sub-network in the forward process; I is an inputted original image, $y^{gt}$ is a standard category label, $L^{gt}$ is a standard localization label box, and $o^{gt}$ is a standard segmentation label box.

In an embodiment, the valve linkage function is defined by the following formula:

$$V(L, O; I, L_f, O_f) = \frac{E_a(c^*, \theta^*, \alpha^*, t^*; I, L, O)}{E_a(c^*, \theta^*, \alpha^*, t^*; I, L_f, O_f)} I(c^*, \theta^*, \alpha^*),$$

V is the valve linkage function, L is a localization region outputted by the localization segmentation sub-network, O is a segmentation region outputted by the localization segmentation sub-network, in the forward process, $L=L_f$, $O=O_f$, in the backward process, L and O are variables, I is an input original image and is a variable in the forward process, and $L_f$ is a localization region outputted by the localization segmentation sub-network in the forward process; $O_f$ is a segmentation region outputted by the localization segmentation sub-network in the forward process, $c^*$ is a template center point used for alignment, θ* is a rotation angle used for alignment, and α* is a target scaling ratio used for alignment, I represents an image after alignment on the original image, $E_a$ is an alignment energy function, the alignment energy function is defined by the following formula:

$E_a(c, \theta, \alpha, t; I, L, O) = S(I(c, \theta, \alpha), t) + \lambda_d D(c, L) + \lambda_s F(O, t_m)$, c represents a template center point, θ represents a rotation angle, α represents a target scaling ratio, t represents a template, S represents a similarity function, $\lambda_d$ and $\lambda_s$ are customized constants, D is a distance function, F is a foreground confidence function, and $t_m$ is a binary mask of the template.

Persons of ordinary skill in the art understand that all or part of the processes in the methods of the foregoing embodiments may be implemented by a computer program instructing relevant hardware. The computer program may be stored in a non-transitory computer-readable storage medium. When the computer program is executed, flows of embodiments of the methods as described above may be included. Any references to memory, storage, databases, or other medium used in the various embodiments provided herein may include non-transitory and/or transitory memory. The non-transitory memory may include a read only memory (ROM), a programmable ROM (PROM), an electrically programmable ROM (EPROM), an electrically erasable programmable ROM (EEPROM), or a flash memory. The transitory memory may include a random access memory (RAM) or an external cache memory. By way of illustration and not limitation, RAM is available in a variety of forms such as static RAM (SRAM), dynamic RAM (DRAM), synchronous DRAM (SDRAM), double data rate SDRAM (DDRSDRAM), enhanced SDRAM (ESDRAM), Synchlink DRAM (SLDRAM), Memory Bus (Rambus) Direct RAM (RDRAM), Direct Memory Bus Dynamic RAM (DRDRAM), Memory Bus Dynamic RAM (RDRAM) etc.

The foregoing respective technical features involved in the respective embodiments can be combined arbitrarily, for brevity, not all possible combinations of the respective technical features in the foregoing embodiments are described, however, to the extent they have no collision with each other, the combination of the respective technical features shall be considered to be within the scope of the description.

The foregoing implementations are merely specific embodiments of the present disclosure, and are not intended to limit the protection scope of the present disclosure. It should be noted that any variation or replacement readily figured out by persons skilled in the art within the technical scope disclosed in the present disclosure shall all fall into the protection scope of the present disclosure. Therefore, the protection scope of the present disclosure shall be subject to the protection scope of the claims.

What is claimed is:

1. A method for image classification comprising:
   a computer device acquiring a to-be-classified image and inputting the to-be-classified image to a trained image classification model, the trained image classification model comprising a localization segmentation sub-network, an alignment sub-network, and a classification sub-network, the alignment sub-network being formulized as a valve linkage function, the image classification model being obtained by training by adjusting parameters of the localization segmentation sub-network and parameters of the classification sub-network by the valve linkage function, and in a forward-propagation phase of the training, an output of the valve linkage function being an aligned image; in a backward-propagation phase of the training, the output of the valve linkage function being a function with respect to a localization region and a segmentation region outputted by the localization segmentation sub-network;
   the computer device subjecting the to-be-classified image through the localization segmentation sub-network for locating and segmenting a target object of the to-be-classified image to obtain a segmented image comprising a localization region and a segmentation region;
   the computer device subjecting the segmented image through the alignment sub-network, the alignment sub-network aligning the target object to obtain an aligned image; and
   the computer device subjecting the aligned image through the classification sub-network for fine-grain classification to obtain a class corresponding to the to-be-classified image.

2. The method according to claim 1, wherein the localization segmentation sub-network comprises a localization sub-network and a segmentation sub-network that share parameters of a convolution neural network.

3. The method according to claim 1, wherein a training step of the image classification model comprises:
   the computer device acquiring a training image set, each training image in the training image set comprising a standard localization label box, a standard segmentation label box, and a standard category label;
   the computer device acquiring a template corresponding to each class from the training image set;
   the computer device inputting each training image in the training image set into the localization segmentation sub-network to obtain a segmented training image comprising a current localization region and a current segmentation region;
   the computer device aligning the segmented training image according to the template to obtain an aligned training image;
   the computer device inputting the aligned training image into a classification sub-network to obtain a corresponding current output class;
   the computer device acquiring a total objective function corresponding to an image classification model, the total objective function comprising an objective function of the localization segmentation sub-network and an objective function of a classification sub-network, wherein the objective function of the localization segmentation sub-network is a function with respect to the valve linkage function; and calculating a value of the total objective function according to the current output class, the standard localization label box, the standard segmentation label box, and the standard category label;
   the computer device adjusting the parameters of the localization segmentation sub-network and parameters of the classification sub-network according to the valve linkage function until the value of the total objective function satisfies a convergence condition; and
   the computer device obtaining the trained image classification model.

4. The method according to claim 3, wherein the acquiring the template corresponding to each class from the training image set comprises:

the computer device calculating a similarity between any two training images in the training image set to form a similarity matrix;

the computer device subjecting the similarity matrix through a spectral clustering algorithm to sort the training images into a plurality of corresponding clusters; and the computer device acquiring each cluster center, determining a target training image corresponding to each cluster and obtaining the template corresponding to each class according to a similarity between each training image in each cluster and a corresponding cluster center, wherein the template is configured to align an image.

5. The method according to claim 3, wherein the aligning the segmented training image according to the template to obtain the aligned training image comprises:

the computer device acquiring an alignment objective function, the alignment objective function comprising a similarity function, a distance function, and a foreground confidence function;

the computer device adjusting a template center point, a rotation angle, a scaling ratio, and a current template until the alignment objective function satisfies the convergence condition to obtain corresponding target template center point, target rotation angle, target scaling ratio, and target template; and the computer device aligning the segmented training image according to the target template center point, the target rotation angle, the target scaling ratio, and the target template to obtain the aligned training image.

6. The method according to claim 3, wherein the total objective function is defined by the following formula:

$$J(W_c, W_{ls}; I, L^{gt}, y^{gt}, o^{gt}) = E_c(W_c; V(L, O; I, L_f, O_f), y^{gt}) + E_{ls}(W_{ls}; I, L^{gt}, o^{gt})$$

wherein J is a total objective function, $E_c$ represents an objective function of the localization segmentation sub-network, $E_{ls}$ represents an objective function of the classification sub-network, $W_c$ represents a parameter to be determined by the localization segmentation sub-network, $W_{ls}$ represents a parameter to be determined by the classification sub-network, V represents a valve linkage function, L is a localization region outputted by the localization segmentation sub-network, O is a segmentation region outputted by the localization segmentation sub-network, I is an inputted original image, $L_f$ is a localization region outputted by the localization segmentation sub-network in the forward process, $O_f$ is a segmentation region outputted by the localization segmentation sub-network in the forward process; I is an inputted original image, $y^{gt}$ is a standard category label, $L^{gt}$ is a standard localization label box, and $o^{gt}$ is a standard segmentation label box.

7. The method according to claim 1, wherein the valve linkage function is defined by the following formula:

$$V(L, O; I, L_f, O_f) = \frac{E_a(c^*, \theta^*, \alpha^*, t^*; I, L, O)}{E_a(c^*, \theta^*, \alpha^*, t^*; I, L_f, O_f)} I(c^*, \theta^*, \alpha^*),$$

wherein V is the valve linkage function, L is a localization region outputted by the localization segmentation sub-network, O is a segmentation region outputted by the localization segmentation sub-network, in the forward process, $L=L_f$, $O=O_f$, in the backward process, L and O are variables, I is an input original image and is a variable in the forward process, and $L_f$ is a localization region outputted by the localization segmentation sub-network in the forward process; $O_f$ is a segmentation region outputted by the localization segmentation sub-network in the forward process, c' is a template center point used for alignment, $\theta^*$ is a rotation angle used for alignment, and $\alpha^*$ is a target scaling ratio used for alignment, I represents an image after alignment on the original image, $E_a$ is an alignment energy function, the alignment energy function is defined by the following formula:

$E_a$ (c, $\theta$, $\alpha$, t; I, L, O)=S(I(c, $\theta$, $\alpha$), t)+$\lambda_d$D(c, L)+$\Delta_s$F(O, $t_m$), wherein c represents a template center point, $\theta$ represents a rotation angle, a represents a target scaling ratio, t represents a template, S represents a similarity function, wherein $\lambda_d$ and $\lambda_s$ are customized constants, D is a distance function, F is a foreground confidence function, and $t_m$ is a binary mask of the template.

8. A computer device, comprising a memory and a processor, the memory storing computer-readable instructions which, when executed by the processor, causing the processor to perform the steps of:

acquiring a to-be-classified image and inputting the to-be-classified image to a trained image classification model, the trained image classification model comprising a localization segmentation sub-network, an alignment sub-network, and a classification sub-network, the alignment sub-network being formulized as a valve linkage function, the image classification model being obtained by training by adjusting parameters of the localization segmentation sub-network and parameters of the classification sub-network by the valve linkage function, and in a forward-propagation phase of the training, an output of the valve linkage function being an aligned image; in a backward-propagation phase of the training, the output of the valve linkage function being a function with respect to a localization region and a segmentation region outputted by the localization segmentation sub-network;

subjecting the to-be-classified image through the localization segmentation sub-network for locating and segmenting a target object of the to-be-classified image to obtain a segmented image comprising a localization region and a segmentation region;

subjecting the segmented image through the alignment sub-network, the alignment sub-network aligning the target object to obtain an aligned image; and subjecting the aligned image through the classification sub-network for fine-grain classification to obtain a class corresponding to the to-be-classified image.

9. The computer device according to claim 8, wherein the localization segmentation sub-network comprises a localization sub-network and a segmentation sub-network that share parameters of a convolution neural network.

10. The computer device according to claim 8, wherein the training of the image classification model comprises:

acquiring a training image set, each training image in the training image set comprising a standard localization label box, a standard segmentation label box, and a standard category label;

acquiring a template corresponding to each class from the training image set;

inputting each training image in the training image set into the localization segmentation sub-network to obtain a segmented training image comprising a current localization region and a current segmentation region;

aligning the segmented training image according to the template to obtain an aligned training image;

inputting the aligned training image into a classification sub-network to obtain a corresponding current output class;

acquiring a total objective function corresponding to an image classification model, the total objective function comprising an objective function of the localization segmentation sub-network and an objective function of a classification sub-network, wherein the objective function of the localization segmentation sub-network is a function with respect to the valve linkage function; and calculating a value of the total objective function according to the current output class, the standard localization label box, the standard segmentation label box, and the standard category label;

adjusting the parameters of the localization segmentation sub-network and parameters of the classification sub-network according to the valve linkage function until the value of the total objective function satisfies a convergence condition; and obtaining the trained image classification model.

11. The computer device according to claim 10, wherein the acquiring the template corresponding to each class from the training image set comprises:

calculating a similarity between any two training images in the training image set to form a similarity matrix;

subjecting the similarity matrix through a spectral clustering algorithm to sort the training images into a plurality of corresponding clusters; and acquiring each cluster center, determining a target training image corresponding to each cluster and obtaining the template corresponding to each class according to a similarity between each training image in each cluster and a corresponding cluster center, wherein the template is configured to align an image.

12. The computer device according to claim 10, wherein the aligning the segmented training image according to the template to obtain the aligned training image comprises:

acquiring an alignment objective function, the alignment objective function comprising a similarity function, a distance function, and a foreground confidence function;

adjusting a template center point, a rotation angle, a scaling ratio, and a current template until the alignment objective function satisfies the convergence condition to obtain corresponding target template center point, target rotation angle, target scaling ratio, and target template; and aligning the segmented training image according to the target template center point, the target rotation angle, the target scaling ratio, and the target template to obtain the aligned training image.

13. The computer device according to claim 10, wherein the total objective function is defined by the following formula:

$$J(W_c, W_{ls}; I, L^{gt}, y^{gt}, o^{gt}) = E_c(W_c; V(L, O; I, L_f, O_f), y^{gt}) + E_{ls}(W_{ls}; I, L^{gt}, o^{gt})$$

wherein J is a total objective function, $E_c$ represents an objective function of the localization segmentation sub-network, $E_{ls}$ represents an objective function of the classification sub-network, $W_c$ represents a parameter to be determined by the localization segmentation sub-network, $W_{ls}$ represents a parameter to be determined by the classification sub-network, V represents a valve linkage function, L is a localization region outputted by the localization segmentation sub-network, O is a segmentation region outputted by the localization segmentation sub-network, I is an inputted original image, $L_f$ is a localization region outputted by the localization segmentation sub-network in the forward process, $O_f$ is a segmentation region outputted by the localization segmentation sub-network in the forward process; I is an inputted original image, $y^{gt}$ is a standard category label, $L^{gt}$ is a standard localization label box, and $o^{gt}$ is a standard segmentation label box.

14. The computer device according to claim 8, wherein the valve linkage function is defined by the following formula:

$$V(L, O; I, L_f, O_f) = \frac{E_a(c^*, \theta^*, \alpha^*, t^*; I, L, O)}{E_a(c^*, \theta^*, \alpha^*, t^*; I, L_f, O_f)} I(c^*, \theta^*, \alpha^*)$$

wherein V is the valve linkage function, L is a localization region outputted by the localization segmentation sub-network, O is a segmentation region outputted by the localization segmentation sub-network, in the forward process, $L=L_f$, $O=O_f$, in the backward process, L and O are variables, I is an input original image and is a variable in the forward process, and $L_f$ is a localization region outputted by the localization segmentation sub-network in the forward process; $O_f$ is a segmentation region outputted by the localization segmentation sub-network in the forward process, $c^*$ is a template center point used for alignment, $\theta^*$ is a rotation angle used for alignment, and $\alpha^*$ is a target scaling ratio used for alignment, I represents an image after alignment on the original image, is an alignment energy function, the alignment energy function is defined by the following formula:

$$E_a(c, \theta, \alpha, t; I, L, O) = S(I(c, \theta, \alpha), t) + \lambda_d D(c, L) + \Delta_s F(O, t_m),$$

wherein c represents a template center point, $\theta$ represents a rotation angle, $\alpha$ represents a target scaling ratio, t represents a template, S represents a similarity function, wherein $\lambda_d$ and $\lambda_s$ are customized constants, D is a distance function, F is a foreground confidence function, and $t_m$ is a binary mask of the template.

15. One or more non-transitory storage medium storing computer-readable instructions which, when executed by one or more processors, causing one or more processors to perform the steps of:

acquiring a to-be-classified image and inputting the to-be-classified image to a trained image classification model, the trained image classification model comprising a localization segmentation sub-network, an alignment sub-network, and a classification sub-network, the alignment sub-network being formulized as a valve linkage function, the image classification model being obtained by training by adjusting parameters of the localization segmentation sub-network and parameters of the classification sub-network by the valve linkage function, and in a forward-propagation phase of the training, an output of the valve linkage function being an aligned image; in a backward-propagation phase of the training, the output of the valve linkage function being a function with respect to a localization region and a segmentation region outputted by the localization segmentation sub-network;

subjecting the to-be-classified image through the localization segmentation sub-network for locating and segmenting a target object of the to-be-classified image to obtain a segmented image comprising a localization region and a segmentation region;

subjecting the segmented image through the alignment sub-network, the alignment sub-network aligning the target object to obtain an aligned image; and subjecting the aligned image through the classification sub-network for fine-grain classification to obtain a class corresponding to the to-be-classified image.

16. The storage medium according to claim 15, wherein the localization segmentation sub-network comprises a localization sub-network and a segmentation sub-network that share parameters of a convolution neural network.

17. The storage medium according to claim 15, wherein the training of the image classification model comprises:

acquiring a training image set, each training image in the training image set comprising a standard localization label box, a standard segmentation label box, and a standard category label;

acquiring a template corresponding to each class from the training image set;

inputting each training image in the training image set into the localization segmentation sub-network to obtain a segmented training image comprising a current localization region and a current segmentation region;

aligning the segmented training image according to the template to obtain an aligned training image;

inputting the aligned training image into a classification sub-network to obtain a corresponding current output class;

acquiring a total objective function corresponding to an image classification model, the total objective function comprising an objective function of the localization segmentation sub-network and an objective function of a classification sub-network, wherein the objective function of the localization segmentation sub-network is a function with respect to the valve linkage function; and calculating a value of the total objective function according to the current output class, the standard localization label box, the standard segmentation label box, and the standard category label;

adjusting the parameters of the localization segmentation sub-network and parameters of the classification sub-network according to the valve linkage function until the value of the total objective function satisfies a convergence condition; and obtaining the trained image classification model.

18. The storage medium according to claim 17, wherein the acquiring the template corresponding to each class from the training image set comprises:

calculating a similarity between any two training images in the training image set to form a similarity matrix;

subjecting the similarity matrix through a spectral clustering algorithm to sort the training images into a plurality of corresponding clusters; and acquiring each cluster center, determining a target training image corresponding to each cluster and obtaining the template corresponding to each class according to a similarity between each training image in each cluster and a corresponding cluster center, wherein the template is configured to align an image.

19. The storage medium according to claim 17, wherein the aligning the segmented training image according to the template to obtain the aligned training image comprises:

acquiring an alignment objective function, the alignment objective function comprising a similarity function, a distance function, and a foreground confidence function;

adjusting a template center point, a rotation angle, a scaling ratio, and a current template until the alignment objective function satisfies the convergence condition to obtain corresponding target template center point, target rotation angle, target scaling ratio, and target template; and aligning the segmented training image according to the target template center point, the target rotation angle, the target scaling ratio, and the target template to obtain the aligned training image.

20. The storage medium according to claim 17, wherein the total objective function is defined by the following formula:

$$J(W_c, W_{ls}; I, L^{gt}, y^{gt}, o^{gt}) = E_c(W_c; V(L, O; I, L_f, O_f), y^{gt}) + E_{ls}(W_{ls}; I, L^{gt}, o^{gt})$$

wherein J is a total objective function, $E_c$ represents an objective function of the localization segmentation sub-network, $E_{ls}$ represents an objective function of the classification sub-network, $W_c$ represents a parameter to be determined by the localization segmentation sub-network, $W_{ls}$ represents a parameter to be determined by the classification sub-network, V represents a valve linkage function, L is a localization region outputted by the localization segmentation sub-network, O is a segmentation region outputted by the localization segmentation sub-network, I is an inputted original image, $L_f$ is a localization region outputted by the localization segmentation sub-network in the forward process, $O_f$ is a segmentation region outputted by the localization segmentation sub-network in the forward process; I is an inputted original image, $y^{gt}$ is a standard category label, $L^{gt}$ is a standard localization label box, and $o^{gt}$ is a standard segmentation label box.

* * * * *